United States Patent
Umeno et al.

(10) Patent No.: US 10,983,231 B2
(45) Date of Patent: Apr. 20, 2021

(54) ABNORMALITY DETECTION APPARATUS, COMMUNICATION APPARATUS, ABNORMALITY DETECTION METHOD, AND RECORDING MEDIUM

(71) Applicant: Kyoto University, Kyoto (JP)

(72) Inventors: Ken Umeno, Kyoto (JP); Takuya Iwata, Kyoto (JP)

(73) Assignee: Kyoto University, Kyoto (JP)

( * ) Notice: Subject to any disclaimer, the term of this patent is extended or adjusted under 35 U.S.C. 154(b) by 112 days.

(21) Appl. No.: 16/463,981

(22) PCT Filed: Nov. 27, 2017

(86) PCT No.: PCT/JP2017/042333
§ 371 (c)(1),
(2) Date: May 24, 2019

(87) PCT Pub. No.: WO2018/097272
PCT Pub. Date: May 31, 2018

(65) Prior Publication Data
US 2020/0233106 A1  Jul. 23, 2020

(30) Foreign Application Priority Data

Nov. 28, 2016  (JP) .............................. JP2016-230526

(51) Int. Cl.
*G01V 1/00*  (2006.01)
(52) U.S. Cl.
CPC .................................. *G01V 1/008* (2013.01)
(58) Field of Classification Search
CPC .......... G01B 15/00; G01V 1/008; G01V 1/00; G01V 9/00
See application file for complete search history.

(56) References Cited

U.S. PATENT DOCUMENTS 6,288,396 B1 *  9/2001  Qiang ................... G01V 1/008
                                                        250/339.14
8,068,985 B1 * 11/2011  Shou ..................... G01V 1/008
                                                        702/2

(Continued)

FOREIGN PATENT DOCUMENTS

CN    101430384 A    5/2009
CN    103197340 A    7/2013

(Continued)

OTHER PUBLICATIONS

Khachikyan et al., Modification of the ionosphere by Precursors of Strong Earthquakes, Jun. 2016, IEEE, Radio Science Bulletin, No. 357, pp. 12-22 (Year: 2016).*

(Continued)

*Primary Examiner* — Elias Desta
(74) *Attorney, Agent, or Firm* — Bret E. Field; Bozicevic, Field & Francis LLP

(57) ABSTRACT

A computer calculates a change amount of a total number of electrons from an observation start time in the ionosphere between an observation station and a satellite based on observation data of a signal received from the satellite by the observation station on the ground. The computer estimates the change amount of the total number of electrons to be calculated next based on the time change of the change amount of the total number of electrons from the observation start time in the ionosphere and calculates a difference (estimation error) between the estimated change amount of the total number of electrons and the actually calculated change amount of the total number of electrons. The computer calculates a correlation value between the estimation error calculated for each observation station and the estimation error calculated for a predetermined number of the observation stations in the vicinity of each observation station. In a case where the correlation value calculated for (Continued)

each observation station is a predetermined threshold value or more, when the correlation value is also the predetermined threshold value or more for the predetermined number of observation stations in the vicinity of the observation station, the computer determines that an abnormality has occurred in the ionosphere between the observation station and the satellite.

23 Claims, 22 Drawing Sheets

(56) References Cited

U.S. PATENT DOCUMENTS

| | | | |
|---|---|---|---|
| 2007/0033153 A1 | 2/2007 | Yamanaka et al. | |
| 2015/0051837 A1 | 2/2015 | Kelley et al. | |

FOREIGN PATENT DOCUMENTS

| | | |
|---|---|---|
| JP | 2005-134316 A | 5/2005 |
| JP | 2015-518146 A | 6/2015 |

OTHER PUBLICATIONS

Heki, "Ionospheric electron enhancement preceding the 2011 Tohoku-Oki earthquake", Geophysical Research Letters, vol. 38, L17312 (p. 1-5), Sep. 15, 2011.

Iwata et al., "Correlation analysis for preseismic total electron content anomalies around the 2011 Tohoku-Oki earthquake", Journal of Geophysical Research: Space Physics, vol. 121, p. 8969-8984, Sep. 10, 2016.

English translation of International Search Report for PCT/JP2017/042333 dated Feb. 27, 2018, 2 pages.

Office Action for Chinese Application No. 201780073701.X dated Aug. 31, 2020, with its English translation, 35 pages.

Liu et al., Modern Business Statistics, Section 2 Describe the statistical analysis method, Aug. 21, 2020, with its English translation, 9 pages.

* cited by examiner

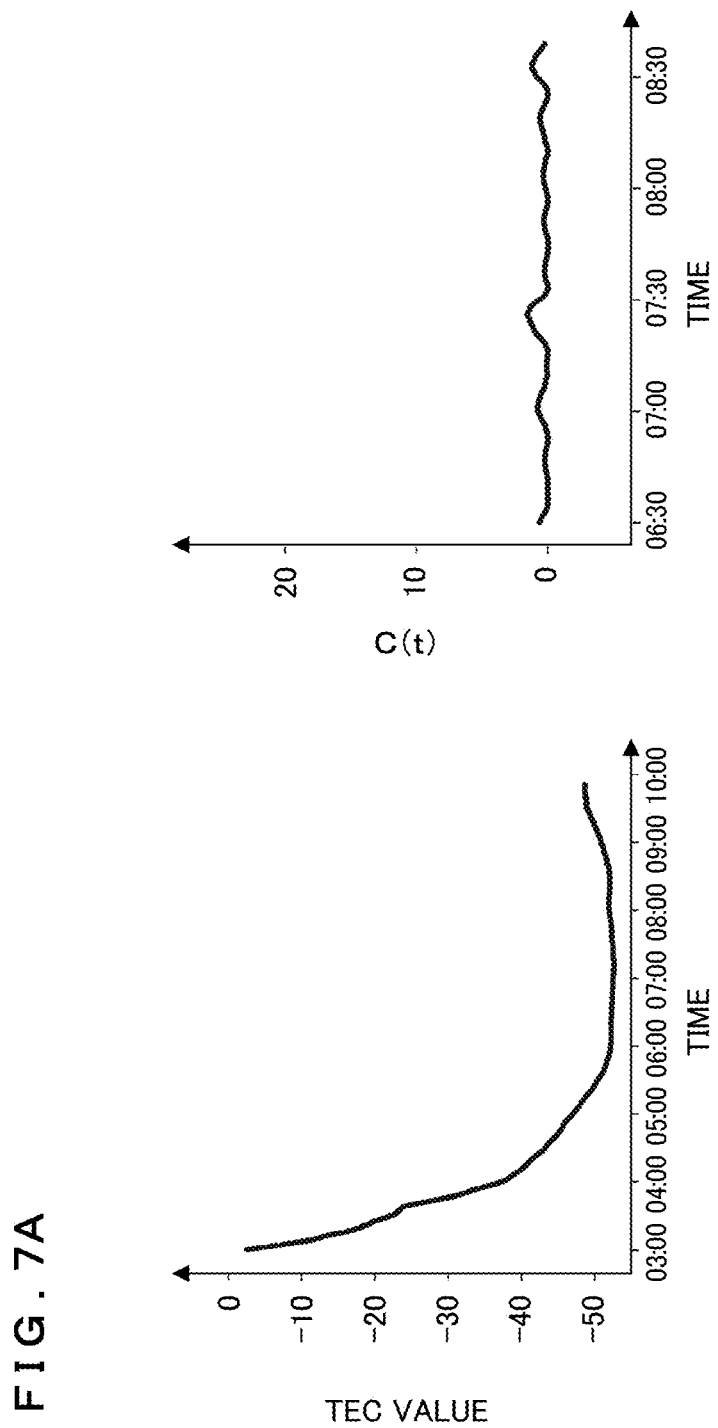

F I G . 20

| THRESHOLD VALUE | PRESENCE OR ABSENCE OF ABNORMALITY DETECTION | PRESENCE OR ABSENCE OF AN OCCURRENCE OF EARTHQUAKE |
|---|---|---|
| ... | ... | ... |
| 2.5 | ABSENCE | ABSENCE |
| 3.3 | ABSENCE | PRESENCE |
| 3.5 | PRESENCE | PRESENCE |
| 3.6 | PRESENCE | PRESENCE |
| ... | ... | ... |

000# ABNORMALITY DETECTION APPARATUS, COMMUNICATION APPARATUS, ABNORMALITY DETECTION METHOD, AND RECORDING MEDIUM

CROSS-REFERENCE TO RELATED APPLICATIONS

This application is the national phase under 35 U.S.C. § 371 of PCT International Application No. PCT/JP2017/042333 which has an International filing date of Nov. 27, 2017 and designated the United States of America.

FIELD

The present invention relates to an abnormality detection apparatus, a communication apparatus, an abnormality detection method, and a recording medium.

BACKGROUND

An earthquake alert has been made to early notify of the occurrence of an earthquake. When an earthquake occurs, seismic waves (vibrations) called primary wave (P waves) and secondary waves (S waves) are transmitted from the seismic center. Because the P wave (initial vibration) and the S wave (main vibration) are transmitted at different speeds, at the time point when the P wave transmitted earlier is detected, the occurrence of an earthquake can be notified with an earthquake alert before the S waves are transmitted. Specifically, at the time point when a P wave is sensed by a seismometer installed near the seismic center, the location and scale (magnitude) of the seismic center can be estimated from the observation data of the P wave, and the arrival time and seismic intensity of an S wave at each location are predicted and notified of on the basis of the estimated location and scale of the seismic center.

In addition, in recent years, research has been made on the relationship between the occurrence of an earthquake and a fluctuation in the number of electrons in the ionosphere called the upper atmosphere. For example, in Heki, K., "Ionospheric electron enhancement preceding the 2011 Tohoku-Oki earthquake", Geophysical Research Letters, Vol. 38, L17312 (2011), it has been known that the number of electrons in the ionosphere above the seismic center in the time zone from about one hour before the occurrence of an earthquake to about 30 minutes after the occurrence of the earthquake is abnormally increased in comparison with the fluctuation in the number of electrons in the ionosphere in other time zones before and after the occurrence of the earthquake.

SUMMARY

In Heki, K., "Ionospheric electron enhancement preceding the 2011 Tohoku-Oki earthquake", Geophysical Research Letters, Vol. 38, L17312 (2011), abnormal fluctuation in the number of electrons (occurrence of an earthquake) in about one and a half hours before and after the occurrence of an earthquake is detected based on the change in the number of electrons in the ionosphere before and after the occurrence of the earthquake. In the case of predicting the occurrence of an earthquake in advance, it is necessary to detect abnormal fluctuation in the number of electrons in the ionosphere by using only data before the occurrence of the earthquake. However, since the number of electrons in the ionosphere also fluctuates due to natural changes of days and seasons, space weather such as sun flare, it is difficult to detect the abnormal fluctuation in the number of electrons in the ionosphere based on only the data before the occurrence of the earthquake with high accuracy.

The present disclosure has been made in view of such circumstances, and an object of the present disclosure is to provide an abnormality detection apparatus or the like capable of detecting abnormal fluctuation in the number of electrons in the ionosphere with high accuracy based on only data before the occurrence of an earthquake.

According to an aspect of the present disclosure, there is provided an abnormality detection apparatus including: a number-of-electrons calculation unit that calculates a change amount of a total number of electrons from an observation start time in an atmosphere between each of a plurality of observation stations installed on a ground and a satellite from information related to a signal received from the satellite for each of a plurality of the observation positions at predetermined time intervals; a difference calculation unit that estimates a change amount to be calculated next by the number-of-electrons calculation unit based on a plurality of the change amounts calculated by the number-of-electrons calculation unit over a first predetermined time for each observation station and calculates a difference between the estimated change amount and the change amount calculated next by the number-of-electrons calculation unit; a correlation value calculation unit that calculates a correlation value between the difference calculated by the difference calculation unit for each observation station and the difference calculated by the difference calculation unit for a first predetermined number of observation stations having a predetermined positional relationship with each observation station; a determination unit that determines that an abnormality has occurred in a change in the total number of electrons between the observation station and the satellite, in a case where the correlation value calculated by the correlation value calculation unit for each observation station is a predetermined threshold value or more; and a reporting unit that performs a reporting process, in a case where it is determined that an abnormality has occurred.

In one aspect of the present disclosure, it is possible to detect an abnormal fluctuation in the number of electrons with high accuracy based on a fluctuation in the number of electrons in the atmosphere before the occurrence of an earthquake (when the earthquake does not occur).

The above and further objects and features will more fully be apparent from the following detailed description with accompanying drawings.

BRIEF DESCRIPTION OF THE DRAWINGS

FIG. 7A is a graph illustrating a time change in the TEC values calculated by the TEC value calculation unit and a time change in correlation values calculated by the correlation value calculation unit.

FIG. 20 is a schematic diagram illustrating a configuration example of a reference data DB.

DETAILED DESCRIPTION

Hereinafter, embodiments according to the present disclosure will be described in detail with reference to the drawings.

First Embodiment

An abnormality detection apparatus according to a first embodiment will be described. In the first embodiment, the abnormality detection apparatus of the present disclosure is implemented by installing a program of the present disclosure in, for example, a computer and executing the program.

Figure 1:
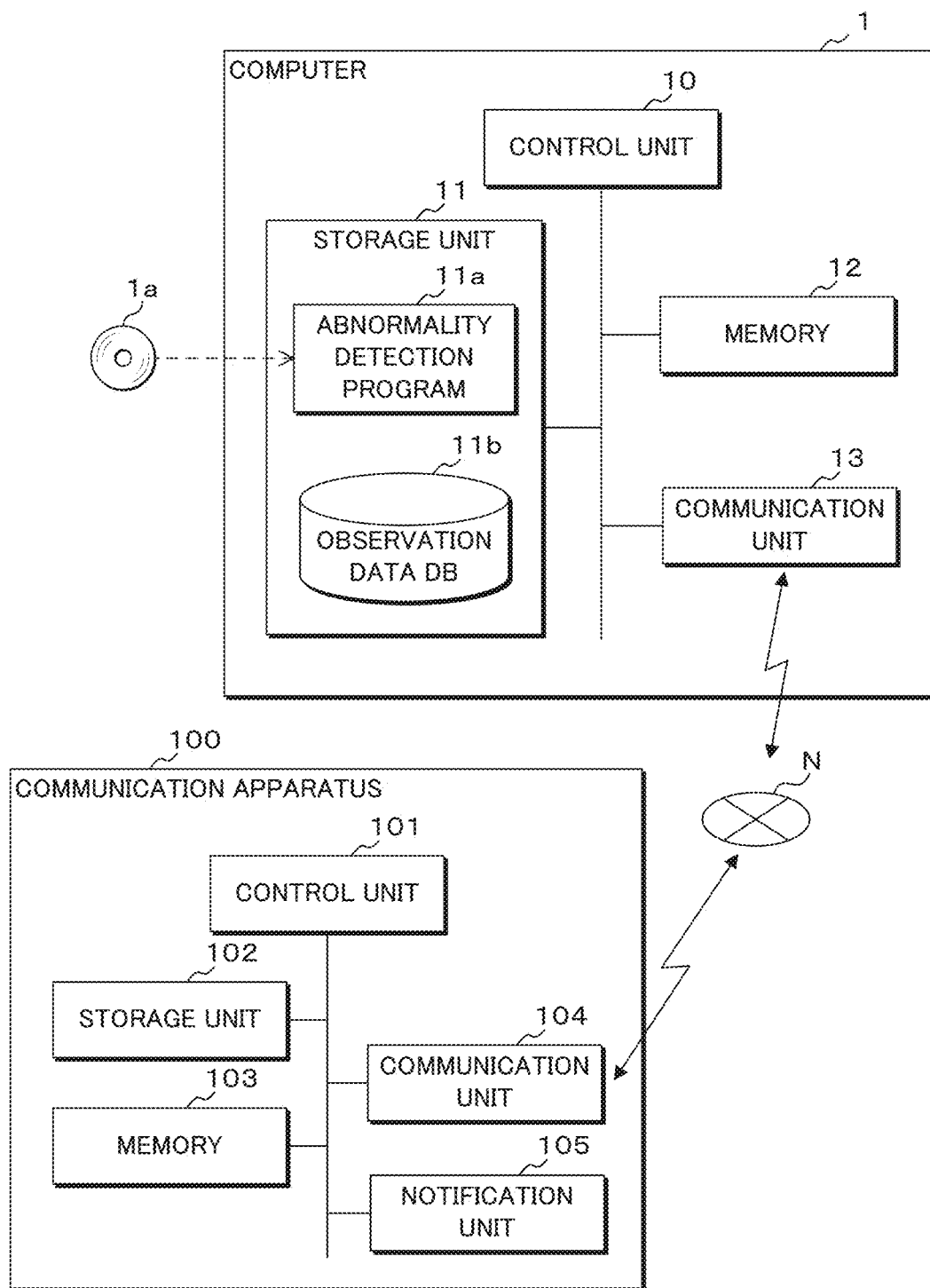
FIG. 1 is a block diagram illustrating a configuration example of a computer and a communication apparatus of a first embodiment.

FIG. 1 is a block diagram illustrating a configuration example of a computer and a communication apparatus according to a first embodiment. The computer 1 is, for example, a personal computer, a work station, a super computer, or the like.

Specifically, the computer 1 includes a control unit 10, a storage unit 11, a memory 12, a communication unit 13, and the like, and these units are connected to each other via a bus. The computer 1 may be further include an operation unit including a keyboard, a mouse, and the like and a display unit such as a liquid crystal display or an organic electro luminescence (EL) display in addition to these units.

The control unit 10 includes a processor such as a central processing unit (CPU) or a micro-processing unit (MPU). The control unit 10 appropriately expands the control program stored in the storage unit 11 in the memory 12 and executes the control program to perform various control processes performed by the computer 1.

The storage unit 11 is, for example, a hard disk, a solid state drive (SSD), or the like. The storage unit 11 stores the various control programs executed by the control unit 10 and various data. The control program stored in the storage unit 11 includes an abnormality detection program 11a, and the data stored in the storage unit 11 includes an observation data database (hereinafter, referred to as an observation data DB) 11b. In addition, the abnormality detection program 11a and the observation data DB 11b may be provided by a recording medium 1a such as a compact disc read only memory (CD-ROM) or a digital versatile disc-ROM (DVD-ROM). In this case, the control unit 10 reads the abnormality detection program 11a and the observation data DB 11b from the recording medium 1a by using a reader (not illustrated) and causes the storage unit 11 to store the abnormality detection program 11a and the observation data DB 11b. In addition, the abnormality detection program 11a and the observation data DB 11b may be provided via the network N such as the Internet. In this case, the control unit 10 downloads the abnormality detection program 11a and the observation data DB 11b from another computer via the communication unit 13 and causes the storage unit 11 to store the abnormality detection program 11a and the observation data DB 11b. In addition, needless to say, one of the abnormality detection program 11a and the observation data DB 11b may be acquired from the recording medium 1a, and the other may be acquired via the network N.

The memory 12 is, for example, a random access memory (RAM), a flash memory, or the like. The memory 12 temporarily stores data generated when the control unit 10 executes a control program stored in the storage unit 11.

The communication unit 13 is an interface for connecting to the network N and communicates with other computers including the communication apparatus 100 via the network N. Communication by the communication unit 13 may be wired communication via a cable or may be wireless communication.

Figure 2:
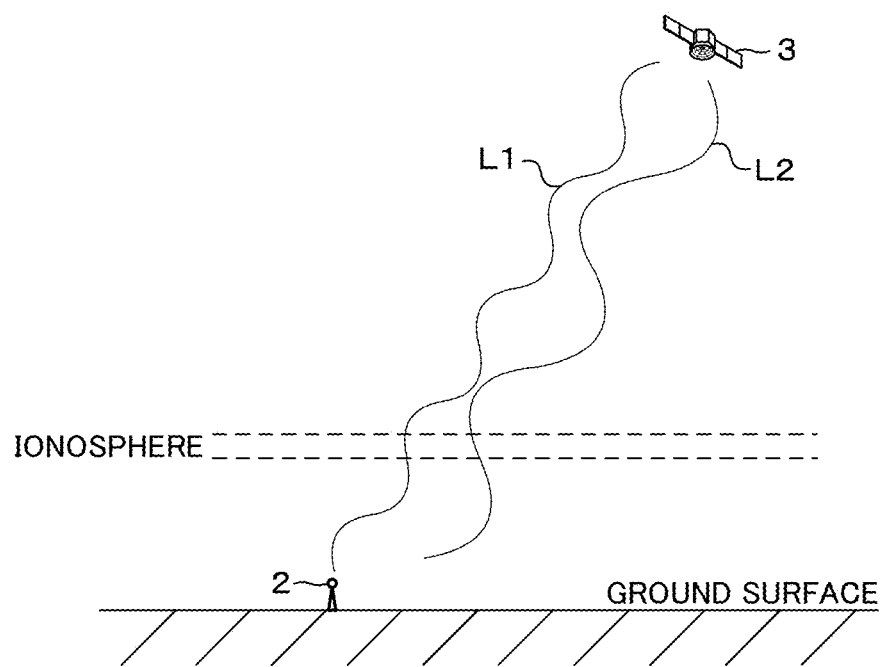
FIG. 2 is a schematic diagram illustrating observation data.

Herein, the observation data stored in the observation data DB 11b will be described. FIG. 2 is a schematic diagram illustrating observation data. The observation data is data on signals (radio waves) received by the observation station 2 installed on the ground (the ground surface) from the satellite 3 arranged in space. For example, the satellite 3 transmits two signals L1 and L2 having different frequencies, and the phases at the time points when the observation station 2 receives the signals L1 and L2 are used as the observation data. In addition, as the signals L1 and L2, for example, signals having frequencies of 1.5 GHz and 1.2 GHz can be used.

At present, about 30 global positioning system (GPS) satellites 3 orbit the earth at an altitude of about 20,000 km from the ground surface. In addition, in Japan, the observation stations 2 for receiving signals from the GPS satellites 3 are installed at about 1300 locations, and thus, a GPS earth observation network (GEONET) is constructed with theses observation stations 2. The GEONET is operated by the Geographical Survey Institute of the Ministry of Land, Infrastructure, Transport and Tourism, and the observation data collected by the GEONET (each observation station 2) are open to the public. Therefore, among the data collected by the GEONET, the phases at time points when the observation station 2 receives the signals L1 and L2 can be used as observation data.

In addition, a number of quasi-zenith satellites are moving on the quasi-zenith orbit at an altitude of about 36,000 km above Japan. A plurality of the quasi-zenith satellites are arranged so that one quasi-zenith satellite always exists near the zenith of Japan (directly above Japan). Therefore, the phases at reception time points of the signals L1 and L2 received by the observation station 2 from the quasi-zenith satellites can be used as the observation data. In countries other than Japan, satellites are arranged above the countries, and for example, in a case where the observation station 2 is installed in India, Indian regional navigational satellite system (IRNSS) satellites in the IRNSS can be used as the satellites 3. The satellite 3 may be any satellite as long as the signals L1 and L2 that can be received by the observation station 2 can be transmitted.

In the observation data DB 11b of the first embodiment, the phases and the reception time points of the signals L1 and L2 received by each observation station 2 at predetermined time intervals (for example, every 30 seconds) are stored in association with each other, for all the observation stations 2 installed in, for example, Japan.

The communication apparatus 100 is, for example, a mobile phone, a smartphone, a personal computer, or the like. Specifically, the communication apparatus 100 includes a control unit 101, a storage unit 102, a memory 103, a communication unit 104, a notification unit 105, and the like, and these units are connected to each other via a bus.

The control unit 101 includes a processor such as a CPU or an MPU and performs various control processes to be performed by the communication apparatus 100 by appropriately expanding the control program stored in the storage unit 102 on the memory 103 and executing the control program.

The storage unit 102 is, for example, a hard disk, an SSD, a flash memory, or the like and stores various control programs executed by the control unit 101 and various data. The memory 103 is, for example, a RAM, a flash memory, or the like and temporarily stores data generated when the control unit 101 executes the control program stored in the storage unit 102.

The communication unit 104 is an interface for connecting to the network N and communicates with, for example, the computer 1 via the network N. Communication by the communication unit 104 may be wired communication via a cable or may be wireless communication.

The notification unit 105 includes, for example, a display unit such as a liquid crystal display or an organic EL display, a lamp, a buzzer, a speaker, and the like and notifies a user of the communication apparatus 100 of a predetermined situation by performing displaying a predetermined message on the display unit, lighting or blinking the lamp, ringing the buzzer, outputting sound by the speaker, or the like in accordance with an instruction from the control unit 101.

Figure 3:
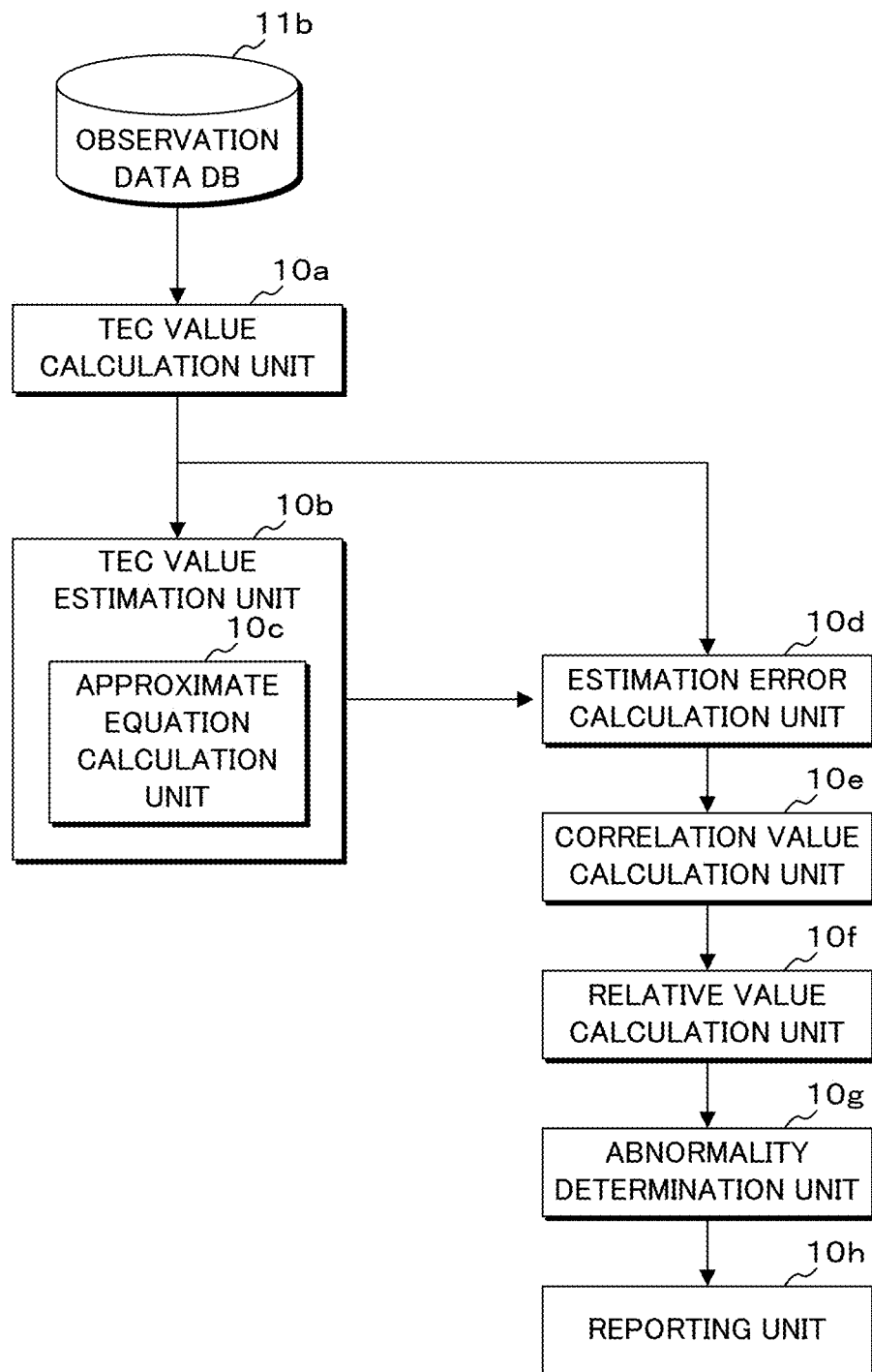
FIG. 3 is a block diagram illustrating functions implemented by a control unit.

Next, functions implemented by the control unit 10 of the computer 1 executing the abnormality detection program 11a will be described. FIG. 3 is a block diagram illustrating the functions implemented by the control unit 10. The control unit 10 executes the abnormality detection program 11a stored in the storage unit 11 to implement functions of a total electron content (TEC) value calculation unit 10a, a TEC value estimation unit 10b, an estimation error calculation unit 10d, a correlation value calculation unit 10e, a relative value calculation unit 10f, an abnormality determination unit 10g, and a reporting unit 10h.

The TEC value calculation unit (number-of-electrons calculation unit) 10a calculates the change amount of the total number of electrons from the observation start time in the atmosphere between each observation station 2 and the satellite 3 based on the observation data stored in the observation data DB 11b. Specifically, the TEC value calculation unit 10a calculates the change amount of the total number of electrons from the observation start time between each observation station 2 and the satellite 3 based on the phases of the signals L1 and L2 received by each observation station 2 from the satellite 3. The signal (radio wave) transmitted from the satellite 3 is delayed by the electrons in the atmosphere, and the delay increases as the number of electrons increases. In addition, since the magnitude of the delay by the electrons also varies depending on the frequency of the signal, the change amount of the total number of electrons from the observation start time in the atmosphere can be calculated by using the difference in delay time between the signals L1 and L2 having different frequencies received from the same satellite 3.

The observation data of the first embodiment are the phases of the signals L1 and L2 received by each observation station 2 at predetermined time intervals (for example, every 30 seconds). Therefore, the TEC value calculation unit 10a sequentially performs a process of calculating the number of electrons based on the observation data, so that the change amount of the number of electrons in the atmosphere between each observation station 2 and the satellite 3 is calculated at predetermined time intervals (for example, every 30 seconds).

Figure 4A:
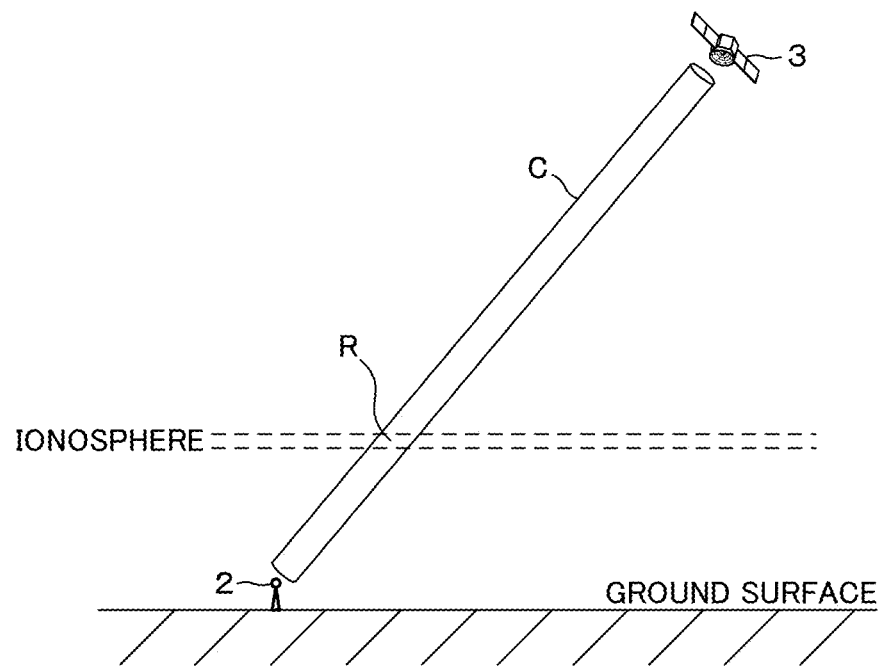
FIG. 4A is a schematic diagram illustrating the number of electrons calculated by a TEC value calculation unit.
Figure 4B:
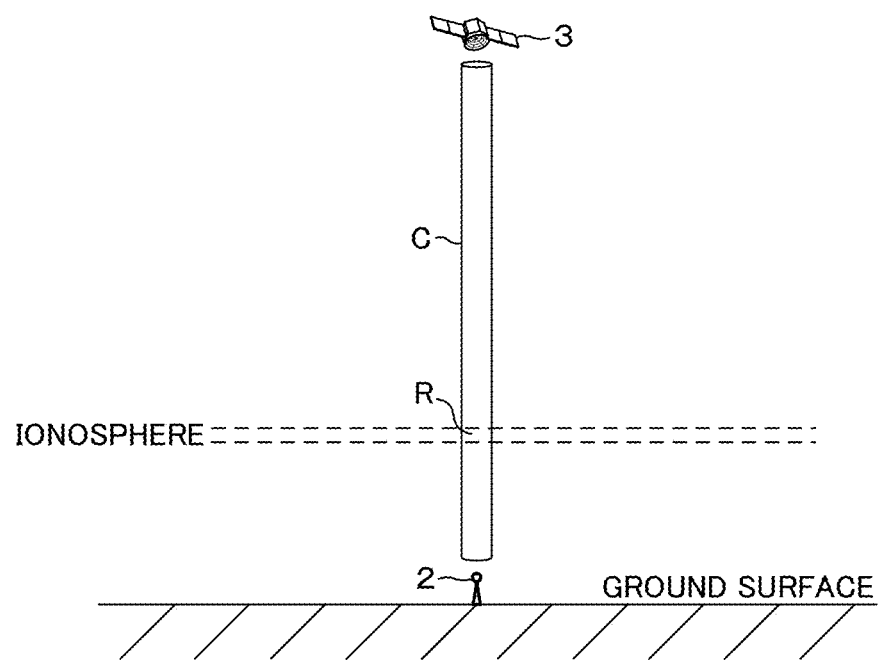
FIG. 4B is a schematic diagram illustrating the number of electrons calculated by the TEC value calculation unit.
Figure 5:
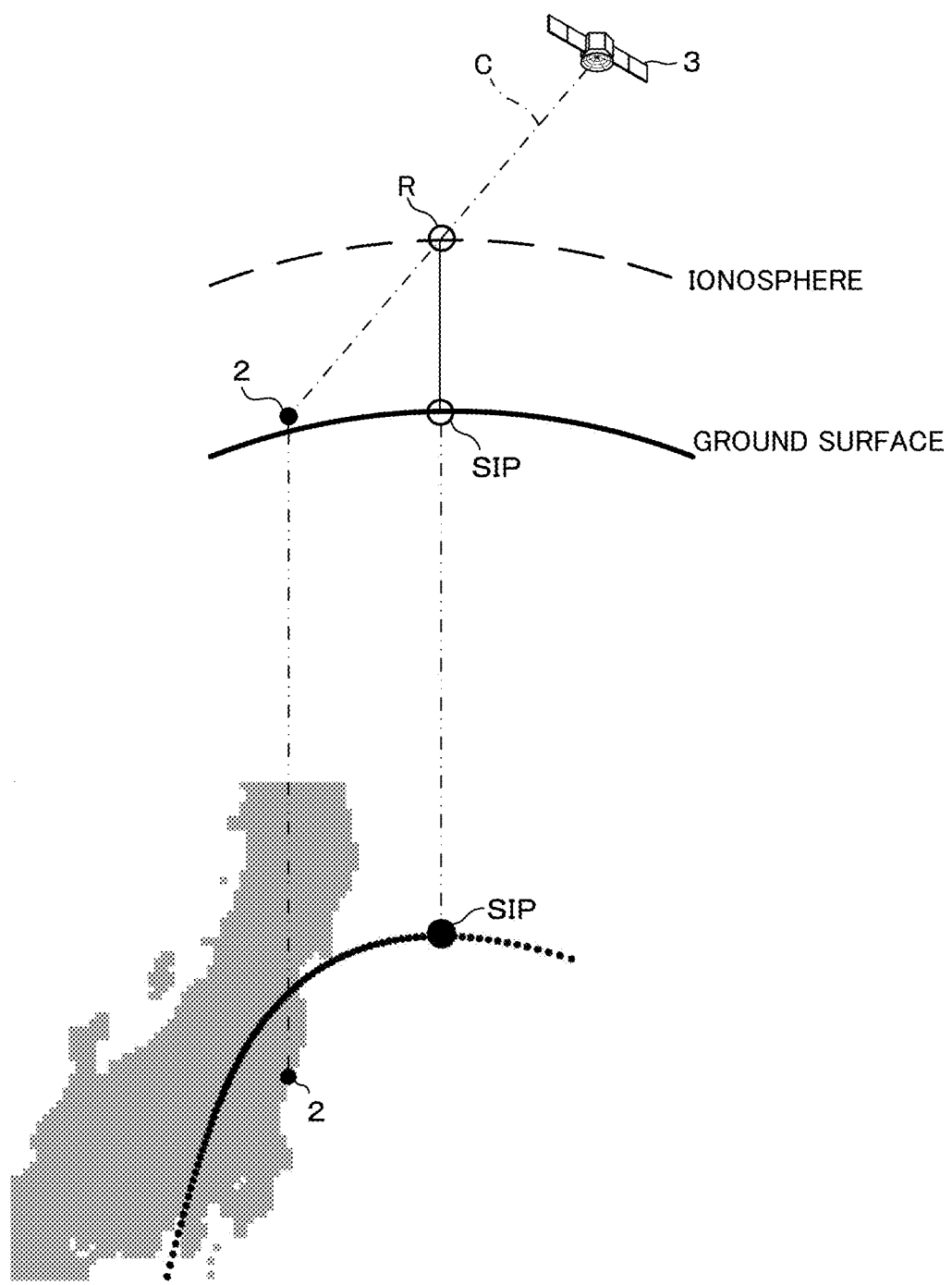
FIG. 5 is a schematic diagram illustrating the number of electrons calculated by the TEC value calculation unit.

FIGS. 4A, 4B, and 5 are schematic diagrams illustrating the number of electrons calculated by the TEC value calculation unit 10a. FIGS. 4A, 4B and the upper portions of FIG. 5 illustrate a part of the cross section of the Earth, and the lower portion of FIG. 5 illustrates a portion (map) of the Earth viewed from the sky.

As a unit of the number of electrons which the TEC value calculation unit 10a calculates, total electron content unit (TECU) is used. One TECU indicates that $1 \times 10^{16}$ electrons exist in a cylinder C with a radius of 1 m connecting the observation station 2 and the satellite 3 as illustrated in FIGS. 4A and 4B. That is, the number of electrons calculated by the TEC value calculation unit 10a is the change amount (TEC value) of the total number of electrons from the observation start time, which exist in a cylinder C with a radius of 1 m connecting the observation station 2 and the satellite 3. In addition, since the satellite 3 is moving on orbit, as illustrated in FIGS. 4A and 4B, the volume of the cylinder C changes according to the position of the satellite 3.

The electrons in the atmosphere have the highest density around 300 km, and this region is called the ionosphere. In addition, it is considered that the number of electrons existing in the cylinder C is substantially the same as the number of electrons existing in the region R where the cylinder C intersects with the ionosphere. Therefore, the change amount of the total number of electrons from the observation start time calculated by the TEC value calculation unit 10a can be treated as the change amount (TEC value) from the observation start time of the total number of electrons in the region R where the cylinder C connecting the observation station 2 and the satellite 3 intersects the ionosphere.

Herein, in some cases, the position (longitude and latitude) immediately below the region R in the ionosphere of the TEC value calculated by the TEC value calculation unit 10a may not be coincident with the position (longitude and latitude) of the observation station 2. The position immediately below the region R is the position of the ground surface where the region R is projected in the vertical downward direction. For example, as illustrated in FIG. 4B, in a case where the satellite 3 exists directly above (vertically upward) the observation station 2, the position immediately below the region R is coincident with the position of the observation station 2. On the other hand, as illustrated in FIGS. 4A and 5, in a case where the satellite 3 does not exist directly above the observation station 2, the position immediately below the region R is not coincident with the position of the observation station 2. In FIG. 4A, the position immediately below the region R is shifted to the right from the position of the observation station 2. In addition, the position (location) immediately below the region R is referred to as a sub-ionospheric point (SIP). In addition, in the following, in some cases, the TEC value in the ionosphere above, for example, the SIP may be referred to as the TEC value in the SIP.

The position (longitude and latitude) of the observation station 2 is known in advance. In addition, information on the altitude of the satellite 3 and the position (longitude and latitude) immediately below the satellite 3 is included in the signal that the observation station 2 receives from the satellite 3. Therefore, SIP information (longitude and latitude) can be calculated by using these pieces of information. The TEC value calculation unit 10a calculates a TEC value between each observation station 2 and the satellite 3 and also calculates SIP information (longitude and latitude) corresponding to the calculated TEC value. In addition, the SIP calculated corresponding to each TEC value is plotted in the lower diagram (map) of FIG. 5, and thus, it can be understood that the SIP moves as the satellite 3 moves over time.

The TEC value calculation unit 10a stores the calculated TEC value and the SIP information in the storage unit 11 in association with the reception time point of the observation data which is, for example, the original data. In addition, the TEC value and the SIP information may be stored in the observation data DB 11b or may be stored in another database generated in the storage unit 11.

Figure 6:
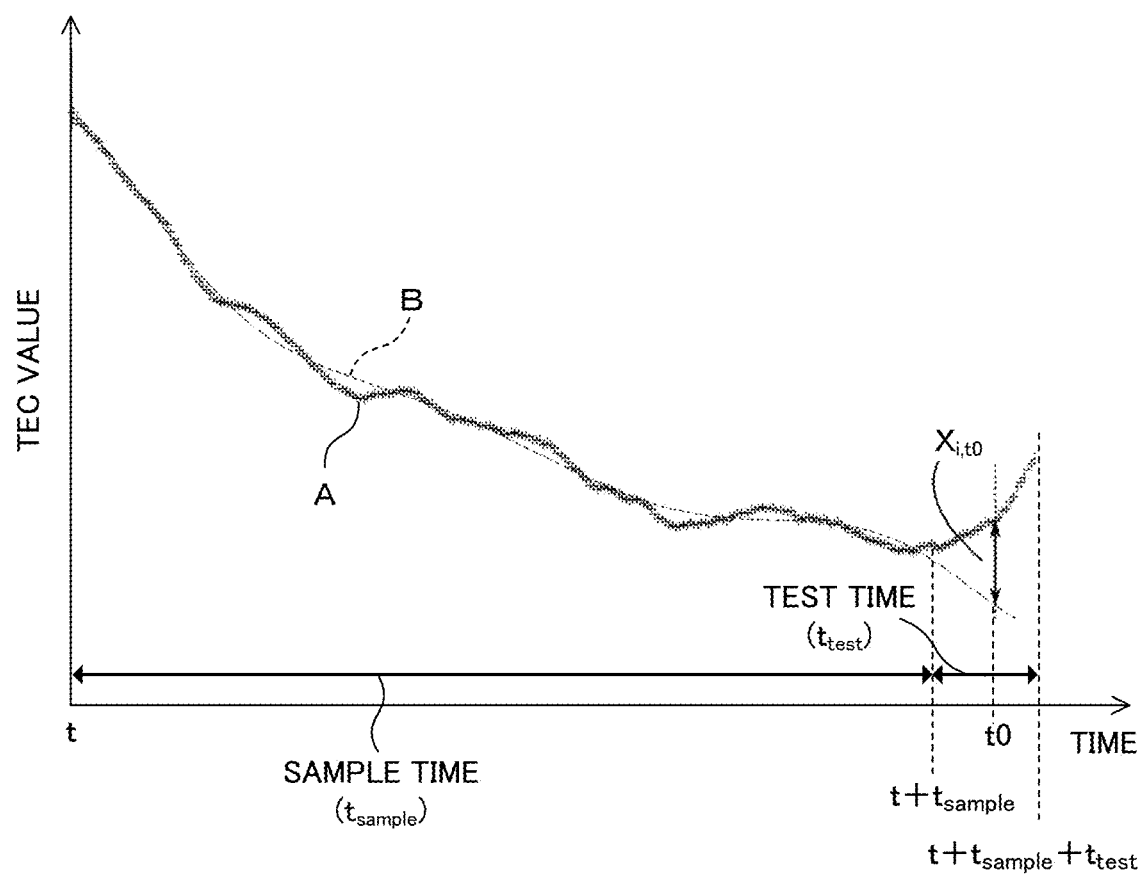
FIG. 6 is a graph illustrating a time change in the TEC value calculated by the TEC value calculation unit.

FIG. 6 is a graph illustrating the time change in the TEC value calculated by the TEC value calculation unit 10a. The horizontal axis in FIG. 6 represents time (for example, coordinated universal time or Japan standard time), and the vertical axis represents the TEC value calculated by the TEC value calculation unit 10a. The solid line A in FIG. 6 plots the TEC values calculated at predetermined time intervals by the TEC value calculation unit 10a over a time from an arbitrary time point (t) to a time point $(t+t_{sample}+t_{test})$ for a certain observation station 2.

Based on a plurality of the TEC values calculated by the TEC value calculation unit 10a over a first predetermined time (hereinafter, referred to as a sample time $t_{sample}$) for each observation station 2 (SIP), the TEC value estimation unit (estimation unit) 10b estimates the TEC values calculated by the TEC value calculation unit 10a over second predetermined time (hereinafter, referred to as a test time $t_{test}$) subsequent to the sample time. In addition, the TEC value estimated by the TEC value estimation unit 10b is a TEC value in the SIP in each observation station 2 and the satellite 3.

The sample time can be set to, for example, 2 hours, and the test time can be set to, for example, 0.25 hours (15 minutes), but the sample time and the test time are not limited to these times. In a case where the sample time is set to 2 hours, the test time is set to 0.25 hours, and the TEC value calculation interval by the TEC value calculation unit 10a (reception interval of the signals L1 and L2 by the observation station 2) is set to 30 seconds, the TEC value calculation unit 10a calculates 240 TEC values within the sample time and calculates 30 TEC values within the test time.

The TEC value estimation unit 10b includes an approximate equation calculation unit 10c. The approximate equation calculation unit 10c calculates an approximate equation indicating a time change in the plurality of TEC values calculated within the sample time for each observation station 2 by using the least squares method. For example, a 7th-order polynomial function can be used as an approximation equation, but the present invention is not limited thereto. A 5th-order polynomial function, a 3rd-order Fourier series, a 7th-order Gaussian function, or the like can also be used. The broken line B in FIG. 6 indicates the TEC value at each time point based on the approximate equation calculated by the approximate equation calculation unit 10c for a certain observation station 2.

The TEC value estimation unit 10b estimates the TEC value to be calculated by the TEC value calculation unit 10a based on the approximation equation calculated by the approximate equation calculation unit 10c for each timing (hereinafter referred to as a calculation timing) when the TEC value calculation unit 10a calculates the TEC value within the test time. In the broken line B in FIG. 6, a portion of the test time indicates the TEC value (estimated TEC value) estimated by the TEC value estimation unit 10b.

The estimation error calculation unit (difference calculation unit) 10d calculates a difference (hereinafter, referred to as an estimation error) between the TEC value calculated by the TEC value calculation unit 10a and the estimated TEC value estimated by the TEC value estimation unit 10b for each calculation timing within the test time for each observation station 2 (SIP).

The TEC value calculation unit 10a, the TEC value estimation unit 10b, and the estimation error calculation unit 10d perform processing for each observation data of each observation station 2. Therefore, the TEC value and the SIP information calculated by the TEC value calculation unit 10a, the estimated TEC value estimated by the TEC value estimation unit 10b, and the estimation error calculated by the estimation error calculation unit 10d can be stored in the observation data DB 11b in association with the observation data of each observation station 2 stored in the observation data DB 11b. In addition, each data does not need to be stored in the observation data DB 11b and may be stored in the storage unit 11 for each observation station 2.

The correlation value calculation unit 10e performs processing based on the estimation error in each observation station 2 (each SIP) calculated by the estimation error calculation unit 10d for each calculation timing within the test time.

The correlation value calculation unit 10e uses one of the plurality of observation stations 2 as a central observation station at each calculation timing within the test time and uses a first predetermined number (for example, 30) of observation stations 2 in the vicinity of the central observation station as a peripheral observation station. It is preferable that the first predetermined number of observation stations 2 are selected as the peripheral observation stations in order of position proximity to the central observation station. Then, the correlation value calculation unit 10e calculates a correlation value between the estimation error calculated by the estimation error calculation unit 10*d* for the central observation station and the estimation error calculated by the estimation error calculation unit 10*d* for each of the peripheral observation stations.

The correlation value calculation unit 10*e* calculates the correlation value C(T) at a time point T in the central observation station $x_0$ based on, for example, the following Equation 1.

[Equation 1]

$$C(T) = \frac{1}{M \times N} \sum_{i=1}^{M} \sum_{j=0}^{N-1} \left(x_{i,t+t_{sample}+j\Delta t}\right) \times \left(x_{0,t+t_{sample}+j\Delta t}\right) \quad \text{(Equation 1)}$$

Herein, $x_0$: central observation station, $x_1$: any one of peripheral observation stations, $x_{0,t0}$: estimation error at a time point t0 in the central observation station $x_0$, $x_{i,t0}$: estimation error at a time point t0 in the peripheral observation station $x_i$, t: arbitrary time point, $t_{sample}$: sample time (first predetermined time), $t_{test}$: test time (second predetermined time), M: the number of peripheral observation stations (first predetermined number), T: time when time $t_{sample}$ and time $t_{test}$ have elapsed from time t, N: the number of TEC values calculated by the TEC value calculation unit 10*a* within the test time, Δt: time interval of the calculation timings of the TEC value ($\Delta t = t_{test}/(N-1)$)

The correlation value calculation unit 10*e* performs the above-described processing on all the observation stations 2 with each observation station 2 being set as the central observation station and calculates the correlation value C(T) in each observation station 2 at each calculation timing within the test time. In addition, it is preferable that, as the estimation error in the central observation station and the estimation error in each of the peripheral observation stations used when calculating the correlation value C(T), values calculated based on observation data received from the same satellite 3 are used.

Since the distance between the observation stations 2 is known in advance, in a case where each observation station 2 is set as a central observation station, the observation stations 2 selected as the peripheral observation stations are known in advance. Therefore, in a case where each observation station 2 is set as a central observation station, the first predetermined number of observation stations 2 which are set as the peripheral observation stations may be stored in advance in the storage unit 11. In addition, although the number (first predetermined number) of peripheral observation stations can be, for example, 30, the present invention is not limited to this number.

Figure 7B:
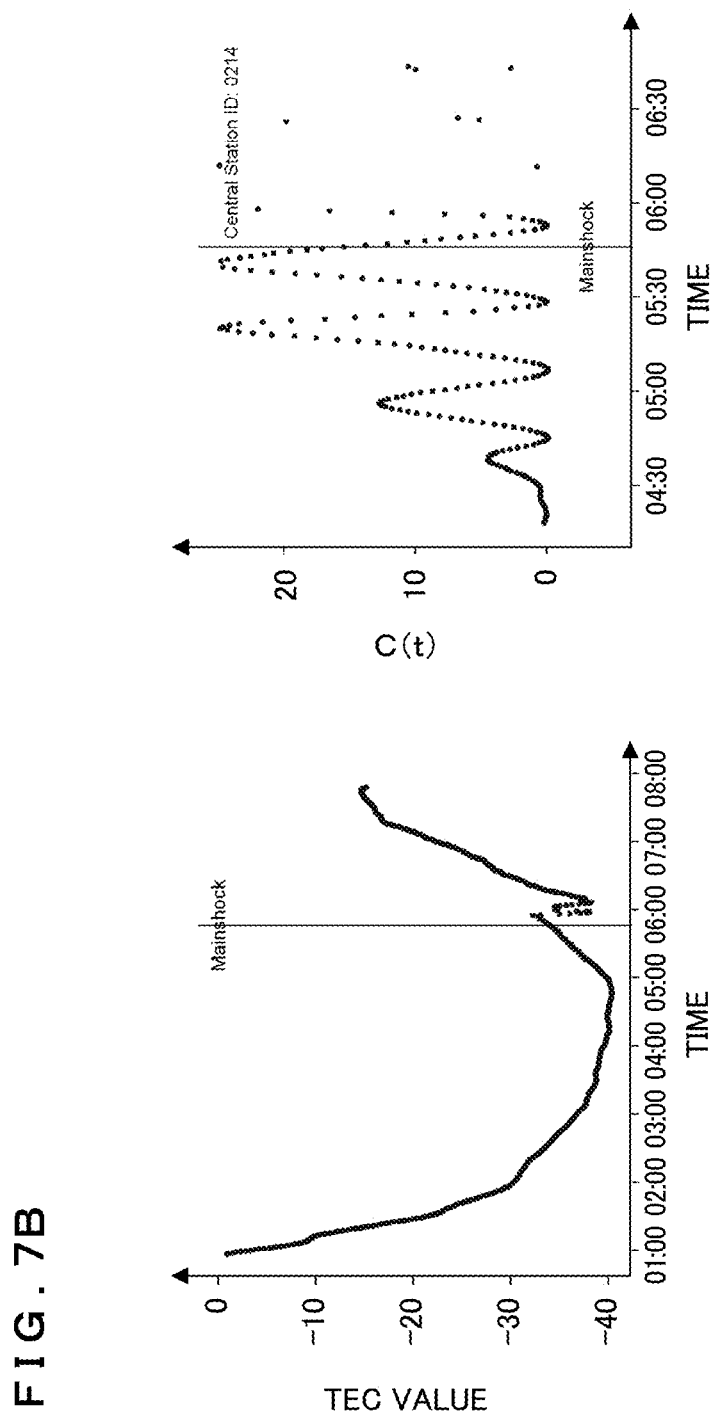
FIG. 7B is a graph illustrating a time change in the TEC values calculated by the TEC value calculation unit and a time change in correlation values calculated by the correlation value calculation unit.

FIGS. 7A and 7B are graphs illustrating a time change in the TEC value calculated by the TEC value calculation unit 10*a* and a time change in the correlation value calculated by the correlation value calculation unit 10*e*. FIG. 7A illustrates time changes in the TEC value and the correlation value when an earthquake does not occur (before the occurrence of an earthquake). The left side of FIG. 7A is a graph illustrating the time change in the TEC value, the horizontal axis represents time, and the vertical axis represents the TEC value calculated by the TEC value calculation unit 10*a*. The right side of FIG. 7A is a graph illustrating the time change of the correlation value, the horizontal axis represents time, and the vertical axis represents the correlation value calculated by the correlation value calculation unit 10*e*. FIG. 7B illustrates time changes of the TEC value and the correlation value before and after the occurrence of an earthquake (time 5:45). Similarly to FIG. 7A, the left side of FIG. 7B is a graph illustrating the time change in the TEC value, and the right side is a graph illustrating the time change of the correlation value.

As illustrated in FIG. 7A, in a case where the time change in the TEC value is a normal change accompanying the movement of the satellite 3, the estimation error calculated by the estimation error calculation unit 10*d* is approximately 0, and in this case, the correlation value calculated by the correlation value calculation unit 10*e* is a small value close to 0, and the change is small. On the other hand, as illustrated in FIG. 7B, in a case where an abnormality occurs in the time change in the TEC value, the estimation error calculated by the estimation error calculation unit 10*d* becomes large, and in this case, the correlation value calculated by the correlation value calculation unit 10*e* is greatly changed. That is, by observing the correlation value calculated by the correlation value calculation unit 10*e*, it is possible to detect the abnormal change in the TEC value.

As expressed in Equation 1 above, in the first embodiment, the correlation value C(T) at a time point T in the central observation station $x_0$ is a value (average value) obtained by dividing a sum of the products of an estimation error in the central observation station $x_0$ at each of the calculation timings within the test time and estimation errors in the peripheral observation stations $x_i$ by the number of products. That is, the correlation value calculation unit 10*e* calculates the correlation value between the estimation errors at two points (the central observation station $x_0$ and the peripheral observation station $x_i$) at the same time.

In addition, the correlation value to be calculated is not limited to the correlation value between two points, and for example, the correlation value between three points can also be used. In this case, for example, an average value obtained by dividing the sum of products of the estimation error in the central observation station and the estimation errors in any two peripheral observation stations by the number of products can be used as the correlation value.

The relative value calculation unit 10*f* performs processing based on the correlation values in all the observation stations 2 (central observation stations) calculated by the correlation value calculation unit 10*e* at a time point T.

The relative value calculation unit (calculation unit) 10*f* calculates the median value med(T) and the standard deviation σ(T) of the correlation values in the observation stations 2 (SIP) calculated by the correlation value calculation unit 10*e* at the time point T. Then, the relative value calculation unit 10*f* uses the calculated median value med(T) and standard deviation σ(T) to calculates a relative value η(T) indicating how different the correlation value C(T) in each observation station 2 is from the median value med(T), based on, for example, Equation 2 below.

$$\eta(T) = (C(T) - med(T))/\sigma(T) \quad \text{(Equation 2)}$$

The abnormality determination unit 10*g* performs processing based on the relative values η(T) in all the observation stations 2 (all the SIPs) calculated by the relative value calculation unit 10*f* at the time point T.

Figure 8:
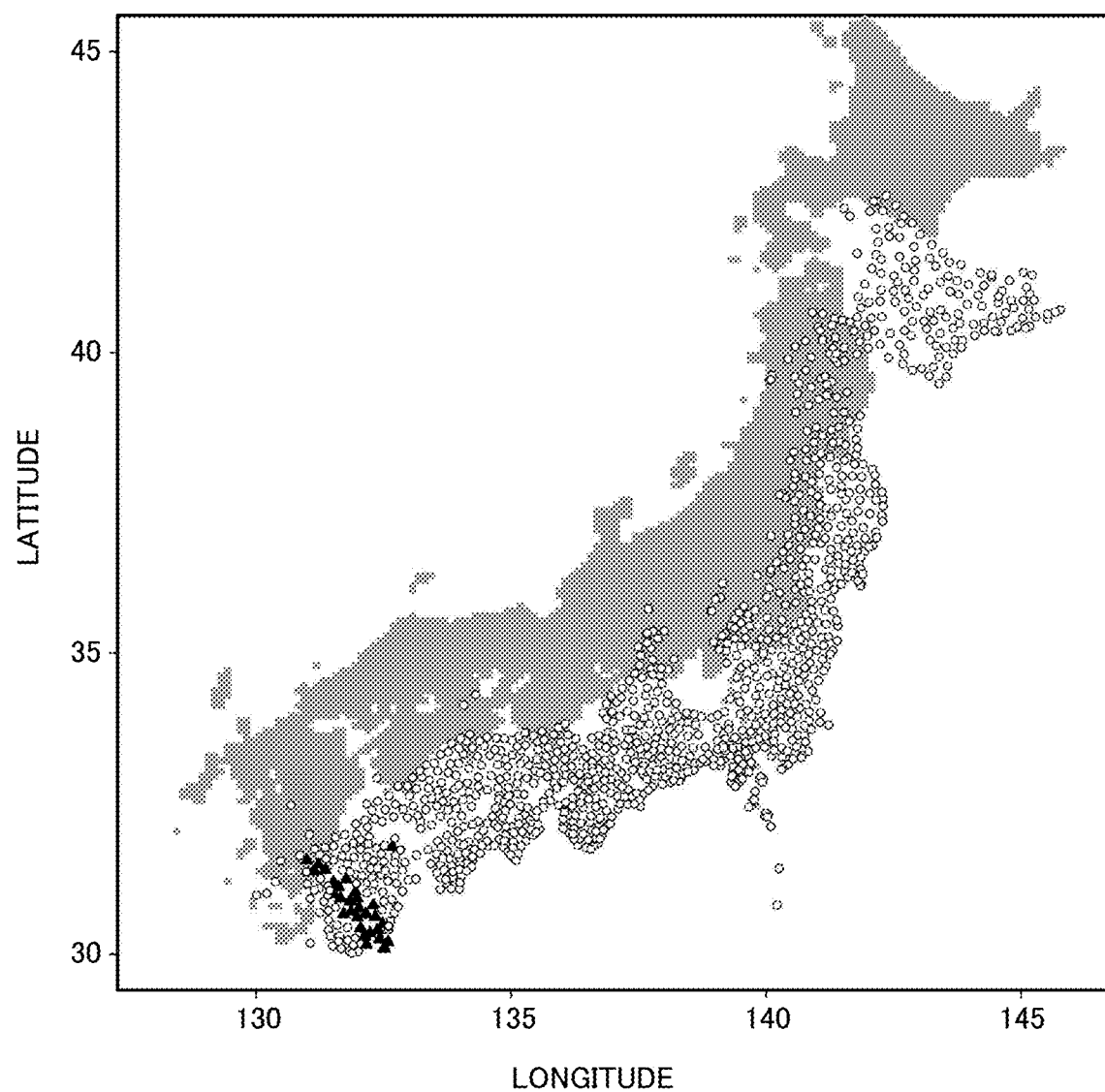
FIG. 8 is a schematic diagram illustrating a determination result by an abnormality determination unit.

The abnormality determination unit 10*g* determines whether or not the relative value in each observation station 2 (each SIP) calculated by the relative value calculation unit 10*f* is a predetermined threshold value or more (for example, 3.5). Then, the abnormality determination unit 10g extracts the observation station 2 (SIP) in which the relative value is a predetermined threshold value or more as the observation station 2 (hereinafter, referred to as the abnormal observation station 2) in which the TEC value in the SIP is likely to have been abnormally changed. FIG. 8 is a schematic diagram illustrating a determination result by the abnormality determination unit 10g. In the map illustrated in FIG. 8, a mark of a black triangle is attached to the SIP in which the observation station 2 is extracted as the abnormal observation station 2, and a mark of a white circle is attached to the SIP in which the observation station 2 is not extracted as the abnormal observation station 2.

It has been known that the TEC value in the ionosphere has been abnormally changed in the SIP close to the seismic center about one hour before the occurrence of a large earthquake. Therefore, in a case where the relative value of each SIP is less than a predetermined threshold value, that is, in a case where the correlation value in each SIP is not changed from the median value of the correlation value, there is a high possibility that this situation is a situation in which the TEC value is merely normally changed accompanying the movement of the satellite 3 or a situation in which, although the change is larger than the normal change, the change is caused by factors other than the occurrence of a large earthquake. Accordingly, it is possible to ensure the accuracy of the determination by determining whether or not the TEC value in each SIP has been abnormally changed according to whether or not the relative value in each SIP is the predetermined threshold value or more. In addition, the predetermined threshold value may be any value as long as it can be determined whether or not an abnormal change occurs in the TEC value due to the occurrence of a large earthquake.

In the first embodiment, the relative value $11(t)$ calculated in each SIP (observation station 2) is used to determine whether or not the TEC value in each SIP has been abnormally changed, but the correlation value in each SIP calculated by the correlation value calculation unit 10e can also be used. In this case, in a case where the correlation value in each SIP is a predetermined threshold value (for example, $3.5\sigma$) or more, it can be determined that the TEC value in each SIP has been abnormally changed.

With respect to the observation station 2 extracted as the abnormal observation station 2, the abnormality determination unit 10g determines whether or not a second predetermined number (for example, four) of the observation stations 2 in the vicinity are also extracted as the abnormal observation stations 2. That is, the observation station 2 in the vicinity also determines whether or not it is determined that the TEC value in the SIP is likely to have been abnormally changed. The abnormal change in TEC value that occurs before the occurrence of a large earthquake is noticeable in the ionosphere above the seismic center. Therefore, there is a high possibility that the TEC value has been abnormally changed not only in one SIP (observation station 2) but also in a plurality of SIPs (observation stations 2) in the vicinity. Therefore, in a case where a plurality of the observation stations 2 in the vicinity are also extracted as the abnormal observation stations 2, it can be determined that the TEC value in the observation station 2 (SIP) has been definitely abnormally changed. Therefore, the abnormality determination unit 10g definitely determines the occurrence of an abnormality. In addition, the number (second predetermined number) of the observation stations 2 in the vicinity is not limited to four.

For example, in a case where the abnormality determination unit 10g definitely determines that the abnormality has occurred, the reporting unit 10h reports information related to the observation station 2 (SIP) in which the abnormality is occurring (the TEC value has been abnormally changed) to the communication apparatus 100 through the communication unit 13.

In the communication apparatus 100 that has received the report, the communication unit 104 receives the information reported from the computer 1, and the control unit 101 causes the notification unit 105 to notify the user of the communication apparatus 100 of the information received by the communication unit 104. For example, in accordance with an instruction from the control unit 101, the notification unit 105 displays a message for notifying of the observation station 2 (SIP) in which the TEC value has been abnormally changed on the display unit or voice-outputs the message with a speaker. In addition, the notification unit 105 may be configured to notify of the occurrence of an abnormality of the TEC value by lighting or blinking of a lamp or by sounding a buzzer.

In the first embodiment, the control unit 10 of the computer 1 executes the abnormality detection program 11a to implement the functions described above. In addition to this, for example, there may be a configuration where a field programmable gate array (FPGA) is used to implement a portion of the functions described above. For example, the TEC value calculation unit 10a, the TEC value estimation unit 10b, the estimation error calculation unit 10d, and the correlation value calculation unit 10e may be implemented by one or a plurality of the FPGAs.

Figure 9:
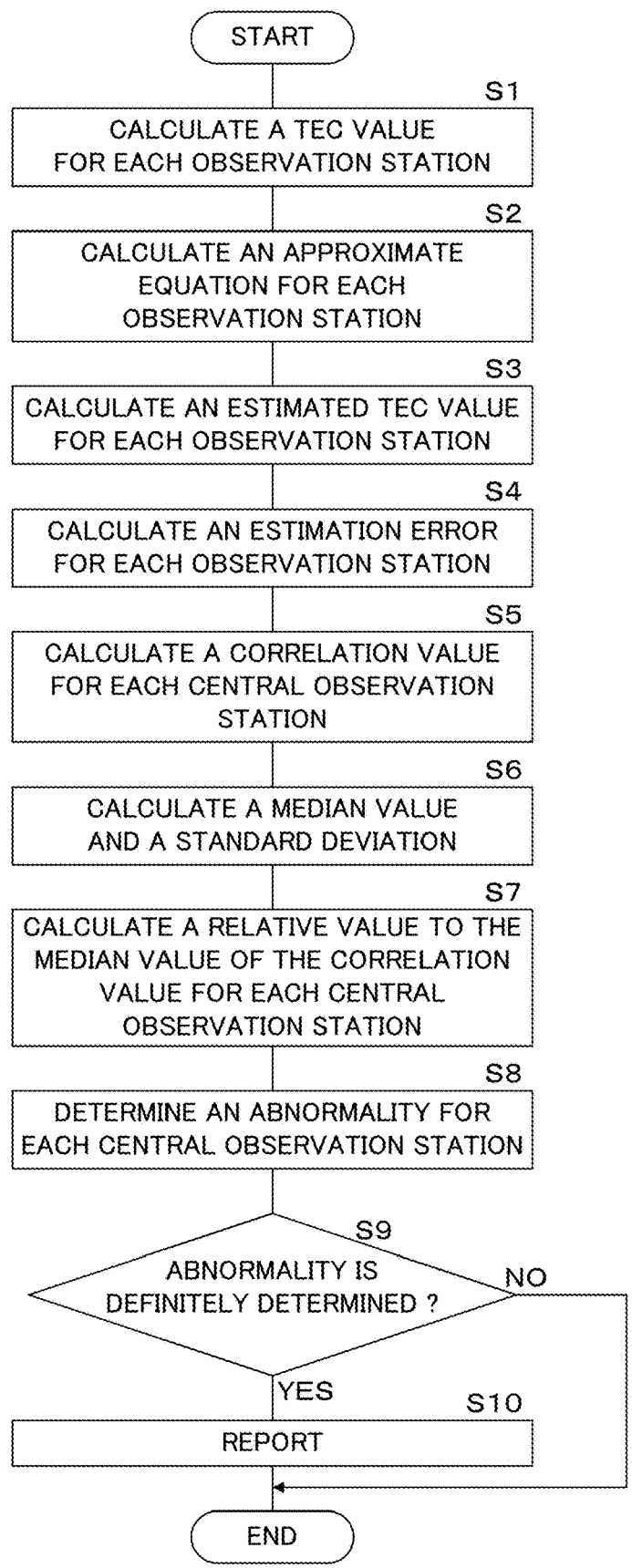
FIG. 9 is a flowchart illustrating a procedure of processes performed by a computer.

Next, processes performed by the computer 1 will be described. FIG. 9 is a flowchart illustrating a procedure of processes performed by the computer 1. The following processes are executed by the control unit 10 in accordance with the abnormality detection program 11a stored in the storage unit 11 of the computer 1. The observation data DB 11b is assumed to store observation data on signals (radio waves) received from the satellite 3 by each observation station 2, specifically, the phases at the time points of receiving two signals L1 and L2 having different frequencies.

The control unit 10 (TEC value calculation unit 10a) of the computer 1 calculates the TEC value in the atmosphere (the ionosphere) between each observation station 2 and the satellite 3 for each observation station 2 based on the observation data stored in the observation data DB 11b (S1). In addition, the control unit 10 calculates the TEC value at predetermined time intervals (for example, every 30 seconds) for each observation station 2. The control unit 10 sequentially calculates the TEC values based on all the observation data stored in the observation data DB 11b. In addition, in a case where the observation data are newly stored in the observation data DB 11b, the control unit 10 sequentially calculates TEC values based on the newly stored observation data at a predetermined timing. The control unit 10 also calculates SIP information (longitude and latitude) corresponding to the TEC value together with the TEC value, and the calculated TEC value and the calculated SIP information are sequentially stored in the storage unit 11 (for example, the observation data DB 11b).

Next, the control unit 10 (approximate equation calculation unit 10c) sets a certain time as the start time of the sample time and calculates an approximate equation indicating a time change in the plurality of TEC values calculated within the sample time for each observation station 2 (SIP) by using the least squares method (S2). Then, the control unit 10 (TEC value estimation unit 10b) calculates an estimated TEC value corresponding to each of the calculation timings of the TEC value within the test time subsequent to the sample time based on the calculated approximate equation (S3). Next, the control unit 10 (estimation error calculation unit 10d) calculates an estimation error between the TEC value calculated in step S1 and the estimated TEC value calculated in step S3 for each calculation timing within the test time for each observation station 2 (SIP) (S4).

Next, for each calculation timing within the test time, the control unit 10 (correlation value calculation unit 10e) sets each observation station 2 as the central observation station and sets the first predetermined number of observation stations 2 in the vicinity of the central observation station as the peripheral observation stations, and the control unit 10 calculates the correlation value in each observation station 2 (central observation station) based on the above-described Equation 1 (S5).

Next, the control unit 10 (relative value calculation unit 100 calculates the median value and the standard deviation of the correlation values in each observation station 2 (each central observation station) calculated for each calculation timing (S6). Then, by using the calculated median value and the calculated standard deviation, the control unit 10 calculates a relative value (a value indicating how much the correlation value differs from the median value) to the median value of the correlation values in each observation station 2 (each central observation station) based on the above-described Equation 2 (S7).

Next, the control unit 10 (abnormality determination unit 10g) determines whether or not the TEC value in each SIP has been abnormally changed based on whether or not the calculated relative value in each observation station 2 (each SIP) is a predetermined threshold value or more. (S8). The control unit 10 extracts the observation station 2 in which the relative value is a predetermined threshold value or more as the abnormal observation station 2.

Next, for the observation station 2 extracted as the abnormal observation station 2, the control unit 10 determines whether or not the second predetermined number of observation stations 2 in the vicinity are also extracted. That is, it is determined whether or not the TEC value in the SIP corresponding to the observation station 2 in the vicinity has been also abnormally changed. In a case where the second predetermined number of observation stations 2 in the vicinity are also extracted, the control unit 10 definitely determines that the TEC value in the SIP corresponding to the observation station 2 has been abnormally changed.

The control unit 10 determines whether or not it is definitely determined that the TEC value in the SIP has been abnormally changed in each observation station 2 extracted as the abnormal observation station 2 (S9). In a case where it is not definitely determined that an abnormal change has occurred in any of the observation stations 2 (S9: NO), the control unit 10 ends the process. In a case where it is definitely determined that an abnormal change has occurred in any of the observation stations 2 (S9: YES), the control unit (reporting unit 10h) 10 reports the information related to the observation station 2 (SIP) for which the occurrence of the abnormality has been definitely determined to, for example, the communication apparatus 100 (S10), and the process ends.

The control unit 10 performs the processes of steps S2 to S10, for example, with each time point every predetermined time (for example, every 30 seconds) being set as the start time of the sample time. Therefore, it is possible to early detect an abnormal change in the TEC value in each SIP.

In the communication apparatus 100 that has received a report from the computer 1, the communication unit 104 receives the reported information, and the control unit 101 causes the notification unit 105 to notify that an abnormality has occurred in the TEC value in one of the observation stations 2 (SIP) based on the information received by the communication unit 104.

In the first embodiment, a signal (direct wave) received by the observation station 2 from the satellite 3 is used as observation data. As the observation data, in some cases, in a configuration in which a signal transmitted from, for example, a transmission antenna on the ground is reflected by the ionosphere and then received by a reception antenna on the ground, the signal (reflected wave) received by the reception antenna may be used. In a case where a direct wave is used as in the first embodiment, in comparison with a case where a reflected wave is used, less noise is added to the received signal in the communication path, and highly accurate observation data can be obtained. Therefore, by using highly accurate observation data, it is possible to detect a change in the TEC value in the ionosphere with high accuracy. In addition, by using the direct wave, the observation position (SIP) in the ionosphere can be easily specified based on the position of the observation station 2 and the position of the satellite 3.

In the first embodiment, in a case where the relative value calculated for a certain SIP is a predetermined threshold value (for example, 3.5) or more or in a case where the calculated correlation value is a predetermined threshold value (for example, 3.5σ) or more, it is determined that the TEC value in the SIP is likely to have been abnormally changed. Then, in a case where it is determined that the TEC value in the second predetermined number of SIPs in the vicinity of the SIP, in which the TEC value is determined to be likely to have been abnormally changed, is also likely to have been abnormally changed, it is definitely determined that the TEC value in the SIP has been definitely abnormally changed. Accordingly, it is possible to detect only the abnormal change in the TEC value accompanying the occurrence of a large earthquake with high accuracy, and it is possible to suppress erroneous reporting.

The method of determining that the TEC value in each SIP has been abnormally changed is not limited to the method described above. For example, the abnormal change in the TEC value in each SIP may be determined based on the number of times of determination that the TEC value in each SIP is likely to have been abnormally changed (the number of calculation timings). That is, in a case where it is determined in each SIP that there is a possibility that the TEC value has been abnormally changed over a predetermined time, the abnormal change in the TEC value in the SIP can also be definitely determined.

In addition, in a case where the number of SIPs (observation station 2) determined that there is a possibility that the TEC value has been abnormally changed is a certain percentage or more (for example, 30% or more) of the plurality of observation stations 2, the detected abnormality of the TEC value may be definitely determined not to be an abnormality accompanying the occurrence of a large earthquake but to be an abnormality caused by space weather and a natural change of day or season, and thus, the computer 1 may not perform the reporting process. It is known that an abnormality in the ionosphere (TEC value) that occurs due to factors other than the occurrence of an earthquake is detected by a certain ratio or more of the observation stations 2 among the observable observation stations 2. Therefore, in a case where the abnormality of the TEC value is simultaneously detected in a certain ratio or more of the observation stations 2, it is definitely determined that the abnormality is not an abnormality accompanying the occurrence of a large earthquake, so that the abnormality of the TEC value that occurs due to factors other than the occurrence of an earthquake can be excluded. Accordingly, it is possible to detect only the abnormal change in the TEC value accompanying the occurrence of a large earthquake with high accuracy, and it is possible to perform a reporting process.

In the first embodiment, it is possible to early detect an abnormal change in the TEC value in the ionosphere with high accuracy. It is known that the TEC value in the ionosphere changes abnormally about one hour before the occurrence of a large earthquake. Therefore, it is possible to early report the abnormal change in the TEC value in the ionosphere detected by the computer 1. In addition, the abnormal change in the TEC value in the ionosphere detected by the computer 1 can be used to predict the seismic center of a large earthquake which is likely to occur from now on before the occurrence of an earthquake. For example, the location relationship between the ionosphere (SIP) in which the TEC value has been abnormally changed and the seismic center, the information on the ground in each SIP, and the like are derived in advance from previous data, and thus, it is possible to predict the location of the seismic center by using these pieces of the information. In a case where the determination result illustrated in FIG. 8 is used, since the TEC value in the SIP on the sea southeast of the southeast end of Kyushu has been abnormally changed, it can be predicted that there is a high possibility that an earthquake occurs from the seismic center that is the vicinity of this location. Therefore, for example, in the communication apparatus 100 of the report destination, in the case of predicting the occurrence of an earthquake and the seismic center before the occurrence of an earthquake based on the information reported from the computer 1 and using the predicted information for emergency alert, it is possible to send an emergency alert, for example, about 30 minutes before the occurrence of an earthquake.

Second Embodiment

A modified example of the abnormality detection apparatus according to the first embodiment described above will be described. In the first embodiment, the configuration in which all processes are performed by using one computer 1 has been described. On the other hand, in a second embodiment, a configuration in which the processes performed by the computer 1 of the first embodiment are distributed and performed by using a plurality of computers will be described.

Figure 10:
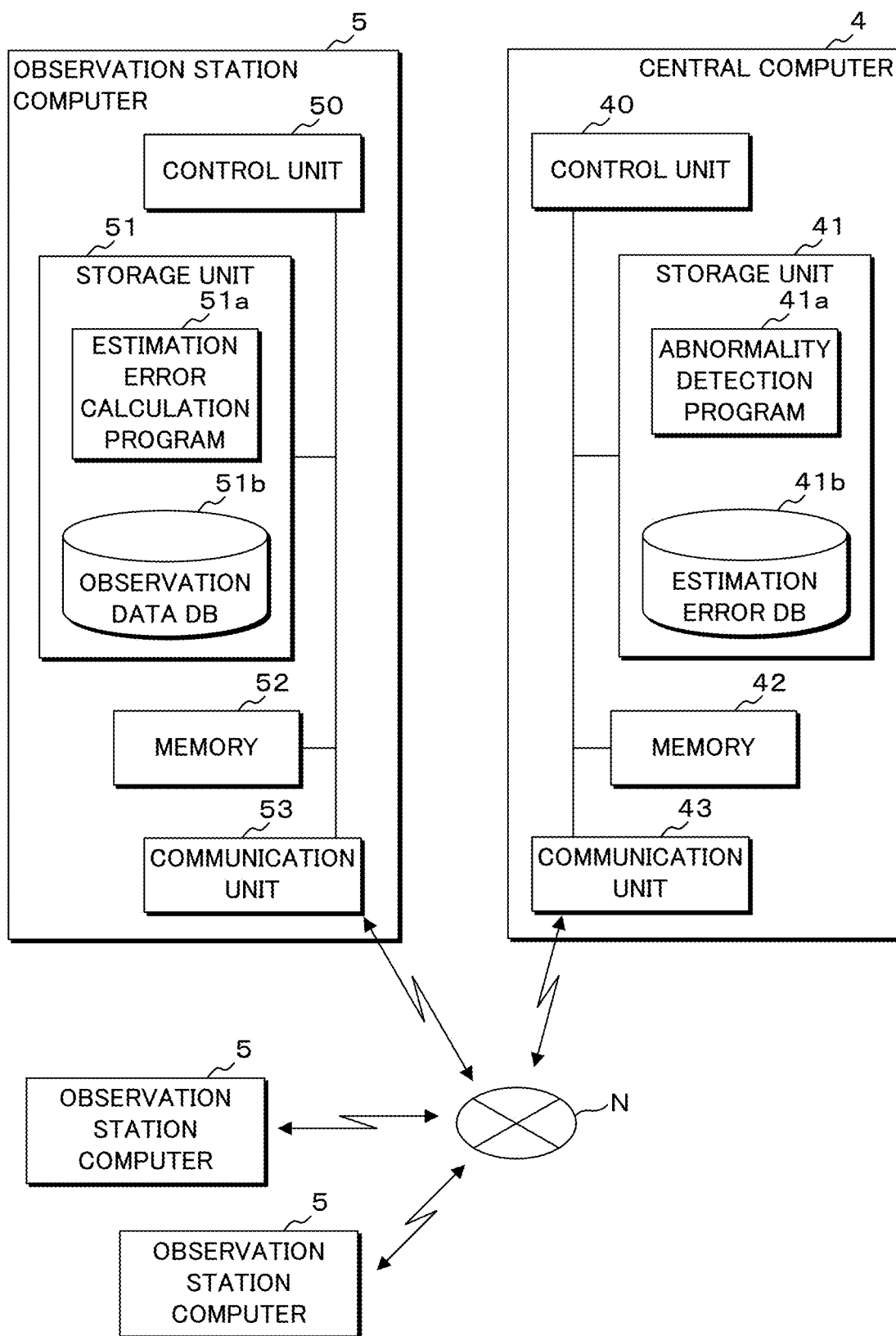
FIG. 10 is a block diagram illustrating a configuration example of an abnormality detection system according to a second embodiment.

FIG. 10 is a block diagram illustrating a configuration example of an abnormality detection system according to the second embodiment. The abnormality detection system according to the second embodiment includes a plurality of observation station computers 5 installed in observation stations 2 and one central computer 4. Each of the observation station computers 5 and the central computer 4 is, for example, a personal computer, a work station, a super computer, or the like. In the second embodiment, a portion (estimation error calculation program 51a) of the abnormality detection program of the present disclosure is installed in each observation station computer 5, and the rest (abnormality detection program 41a) is installed in the central computer 4. And, as a whole, the same processes as those of the computer 1 of the first embodiment are performed.

The observation station computer 5 includes a control unit 50, a storage unit 51, a memory 52, a communication unit 53, and the like, and these units are connected to each other via a bus. The control unit 50 includes a processor such as a CPU or an MPU and appropriately expands and executes a control program stored in the storage unit 51 in the memory 52 to perform various control processes performed by the observation station computer 5. The storage unit 51 is, for example, a hard disk, an SSD, or the like and stores various control programs executed by the control unit 50 and various data. The control program stored in the storage unit 51 includes the estimation error calculation program 51a, and the data stored in the storage unit 51 includes an observation data DB 51b.

The memory 52 is, for example, a RAM, a flash memory or the like and temporarily stores data generated when the control unit 50 executes the control program stored in the storage unit 51.

The communication unit 53 is an interface for connecting to the network N and communicates with other computers via the network N. The communication by the communication unit 53 may be wired communication via a cable or may be wireless communication.

Although the contents of the observation data stored in the observation data DB 51b are the same as the observation data of the first embodiment, the contents of the observation data are only the data on the signal (radio wave) received from the satellite 3 by the observation station 2 in which the observation station computer 5 is installed.

The control unit 50 of the observation station computer 5 executes the estimation error calculation program 51a to implement the functions of the TEC value calculation unit 10a, the TEC value estimation unit 10b, and the estimation error calculation unit 10d among the functions implemented by the control unit 10 of the computer 1 of the first embodiment. In addition, the TEC value calculation unit 10a, the TEC value estimation unit 10b, and the estimation error calculation unit 10d implemented by the control unit 50 of the observation station computer 5 are only the processes based on the observation data by the observation station 2 in which the observation station computer 5 of its own is installed. Therefore, for example, the TEC value calculation unit 10a calculates only the TEC value between the observation station 2 in which the observation station computer 5 of its own is installed and the satellite 3. The TEC value estimation unit 10b and the estimation error calculation unit 10d of the second embodiment perform the same processes as those of the first embodiment.

The control unit 50 of the observation station computer 5 transmits the estimation error calculated by the estimation error calculation unit 10d for each calculation timing within the test time from the communication unit 53 to the central computer 4. In addition, the control unit 50 transmits each calculation timing (each reception time point of observation data) within the test time, the SIP information calculated by the TEC value calculation unit 10a, and the estimation error to the central computer 4 in association with each other.

The central computer 4 includes a control unit 40, a storage unit 41, a memory 42, a communication unit 43 and the like, and these units are connected to each other via a bus. The control unit 40 includes a processor such as a CPU or an MPU and appropriately expands the control program stored in the storage unit 41 in the memory 42 and executes the control program to perform various control processes performed by the central computer 4. The storage unit 41 is, for example, a hard disk, an SSD, or the like and stores the various control programs executed by the control unit 40 and various data. The control program stored in the storage unit 41 includes an abnormality detection program 41*a*, and the data stored in the storage unit 41 includes an estimation error database (hereinafter, referred to as an estimation error DB) 41*b*.

The memory 42 is, for example, a RAM, a flash memory, or the like and temporarily stores data generated when the control unit 40 executes the control program stored in the storage unit 41.

The communication unit 43 is an interface for connecting to the network N and communicates with other computers via the network N. The communication by the communication unit 43 may be wired communication via a cable or may be wireless communication.

In the estimation error DB 41*b*, each calculation timing within the test time, the information on the SIP, and the estimation error received from each observation station computer 5 are stored in association with each observation station 2. Each time when receiving each piece of the information from each observation station computer 5, the control unit 40 causes the information to be stored in the estimation error DB 41*b* in association with each observation station 2.

The control unit 40 of the central computer 4 executes the abnormality detection program 41*a* to implement the functions of the correlation value calculation unit 10*e*, the relative value calculation unit 10*f*, the abnormality determination unit 10*g*, and the reporting unit 10*h* among the functions implemented by the control unit 10 of the computer 1 of the first embodiment. The correlation value calculation unit 10*e* of the second embodiment calculates the correlation value in each observation station 2 (central observation station) at each calculation timing within the test time based on the estimation error received from each observation station 2 and stored in the estimation error DB 41*b*. The relative value calculation unit 10*f*, the abnormality determination unit 10*g*, and the reporting unit 10*h* of the second embodiment perform the same processes as those of the first embodiment.

Each of the observation station computer 5 and the central computer 4 may include an operation unit such as a keyboard and a mouse and a display unit such as a liquid crystal display and an organic EL display, in addition to the above-described units.

Figure 11:
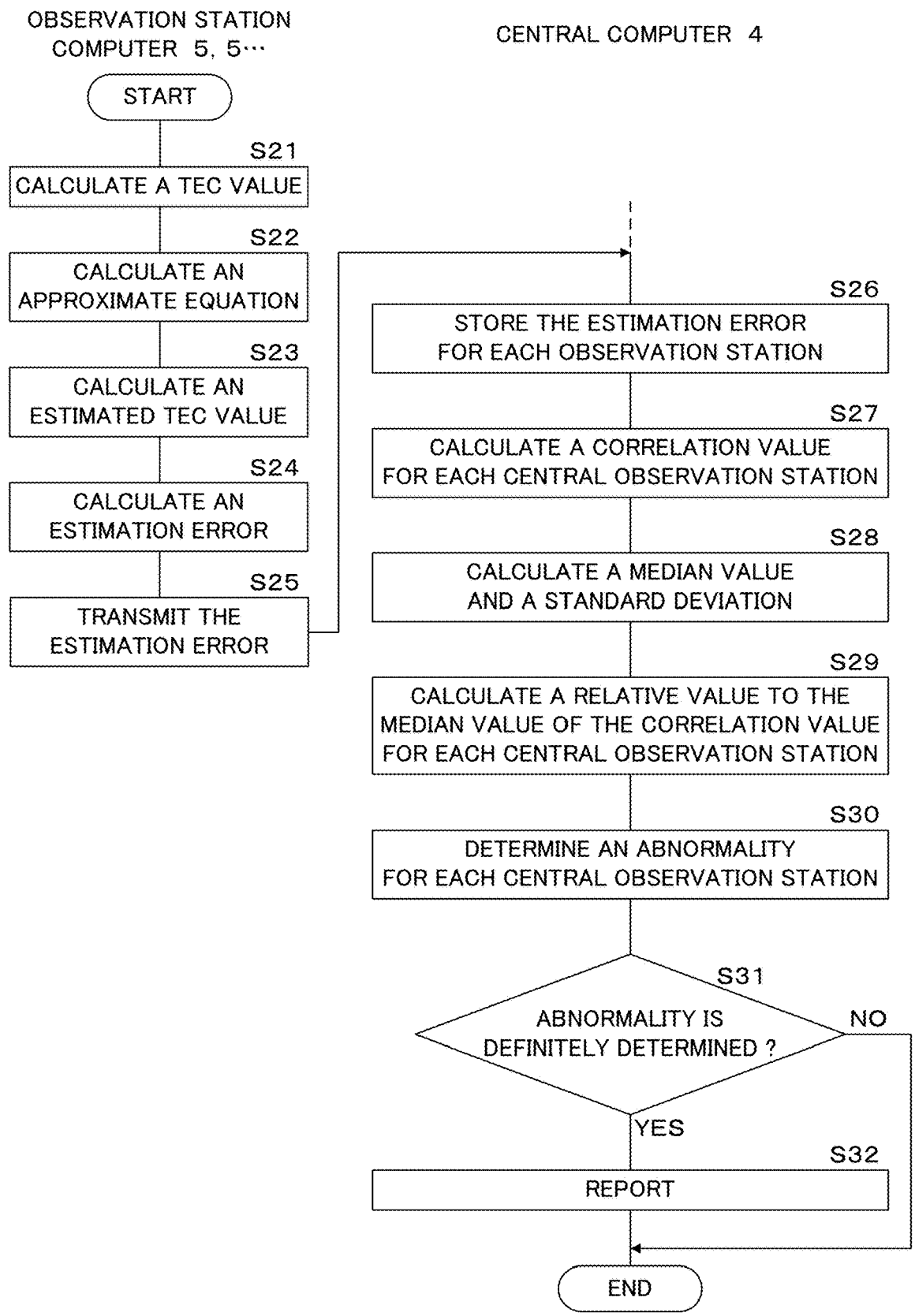
FIG. 11 is a flowchart illustrating a procedure of processes performed by an observation station computer and a central computer.

Next, processes performed by the observation station computer 5 and the central computer 4 in the abnormality detection system according to the second embodiment will be described. FIG. 11 is a flowchart illustrating a procedure of the processes performed by the observation station computer 5 and the central computer 4. In FIG. 11, the processes performed by the observation station computer 5 are illustrated on the left, and the processes performed by the central computer 4 are illustrated on the right. The observation data DB 51*b* of each observation station computer 5 is assumed to store observation data on signals (radio waves) received from the satellite 3 by the observation station 2 where each observation station computer 5 is installed.

The control unit 50 of the observation station computer 5 performs the same processes as those of steps S1 to S4 performed by the computer 1 of the first embodiment as illustrated in FIGS. 9 (S21 to S24). In addition, the observation station computer 5 calculate the values (TEC value, approximate equation, estimated TEC value, and estimation error) of each ionosphere (SIP) between the observation station 2 in which the observation station computer 5 of its own is installed and the satellite 3, based on the observation data stored in the observation data DB 51*b*.

The control unit 50 transmits the estimation error calculated in step S24 from the communication unit 53 to the central computer 4 (S25).

The control unit 40 of the central computer 4 stores the estimation error received from each observation station computer 5 in the estimation error DB 41*b* for each observation station 2 (S26).

Then, as illustrated in FIG. 9, the control unit 40 of the central computer 4 performs the same processes as those of steps S5 to S10 performed by the computer 1 of the first embodiment (S27 to S32).

As described above, even in a case where the processes performed by the computer 1 of the first embodiment are distributed to the observation station computer 5 and the central computer 4, the same effects as those of the first embodiment can be obtained. Therefore, also in the second embodiment, it is possible to detect the change in the TEC value in the ionosphere with high accuracy, and thus, it is possible to detect only the abnormal change in the TEC value accompanying the occurrence of a large earthquake with high accuracy.

In addition, in the second embodiment, the observation station computer 5 performs the processes that can be executed by each observation station 2, so that it is possible to reduce the processing load of the central computer 4.

Third Embodiment

A modified example of the abnormality detection apparatus according to the first embodiment described above will be described. The abnormality detection apparatus according to the third embodiment can be implemented by the computer 1 of the first embodiment. Therefore, the description of the configuration of the computer 1 of the third embodiment will be omitted.

Figure 12:
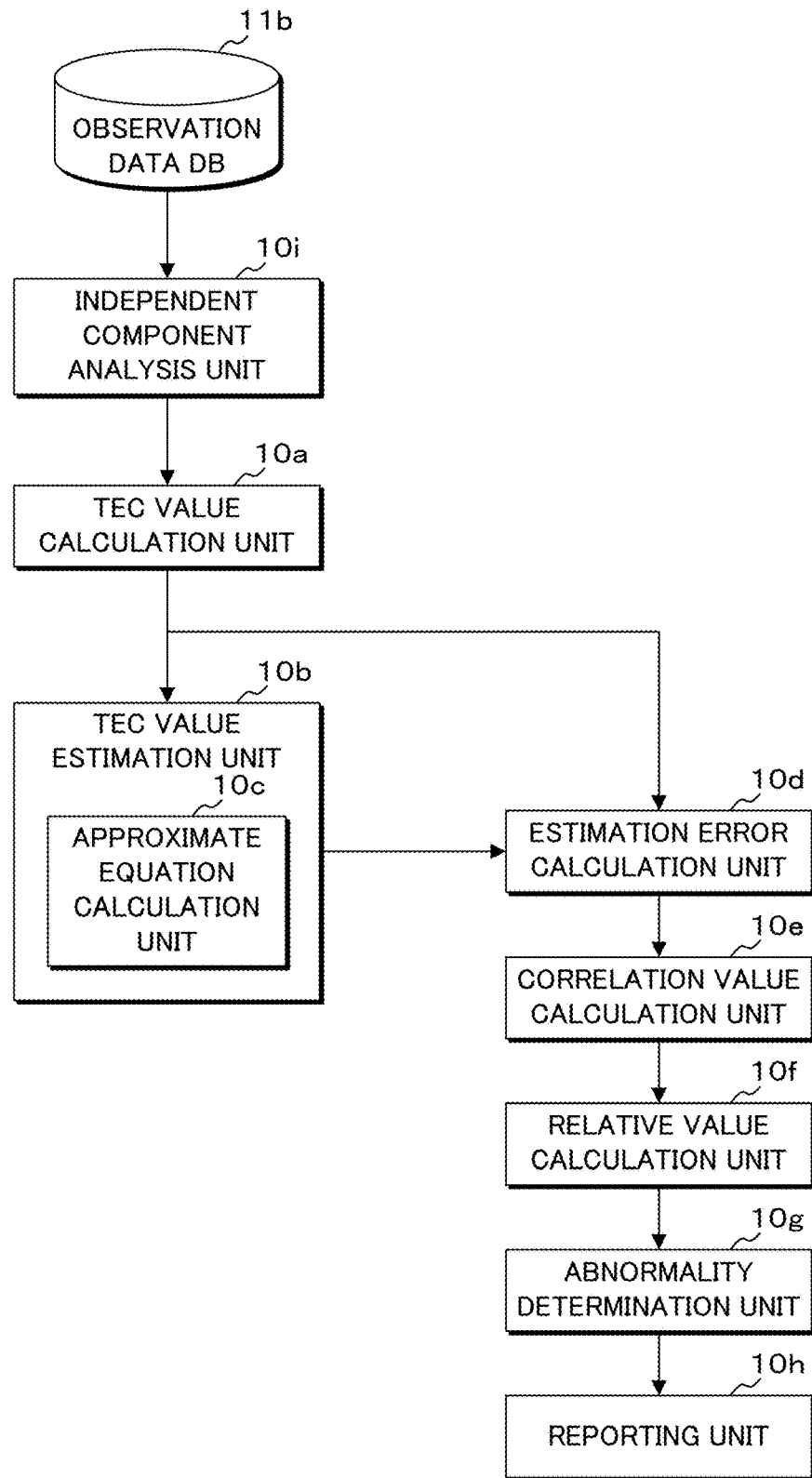
FIG. 12 is a block diagram illustrating functions implemented by a control unit of a computer of the third embodiment.

FIG. 12 is a block diagram illustrating functions implemented by the control unit 10 of the computer 1 of the third embodiment. Also in the computer 1 of the third embodiment, the control unit 10 executes the abnormality detection program 11*a* to implement the functions of the TEC value calculation unit 10*a*, the TEC value estimation unit 10*b*, the estimation error calculation unit 10*d*, the correlation value calculation unit 10*e*, the relative value calculation unit 10*f*, the abnormality determination unit 10*g*, and the reporting unit 10*h*. These units perform the same processes as those in the first embodiment.

In the computer 1 of the third embodiment, the control unit 10 further implements a function of an independent component analysis unit 10*i*. The independent component analysis unit 10*i* separates the observation data stored in the observation data DB 11*b* into a component of the signal transmitted from the satellite 3 and a component of the noise added to the signal in the communication path. Therefore, the TEC value calculation unit 10*a* of the third embodiment calculates the TEC value based on the observation data processed by the independent component analysis unit 10*i*.

As described above, by performing the independent component analysis on the observation data used for calculating the TEC value, it is possible to remove the noise component from the signal received by the observation station 2, and it is possible to obtain the observation data with higher accuracy. Therefore, by using such observation data, it is possible to detect a change in the TEC value in the ionosphere with high accuracy.

The configuration of the third embodiment is also applicable to the second embodiment. That is, the second embodiment can have such a configuration where the observation station computer 5 performs a process by the independent component analysis unit 10i on the observation data stored in the observation data DB 51b and, after that, performs the TEC value calculation process by the TEC value calculation unit 10a. Also in this case, it is possible to obtain highly accurate observation data from which noise has been removed, so that it is possible to detect a change in the TEC value in the ionosphere with high accuracy.

Even in the case of such a configuration, the same operations as those of the above-described first and second embodiments can be implemented, so that the same effects can be obtained.

Fourth Embodiment

A modified example of the abnormality detection apparatus according to the third embodiment described above will be described. An abnormality detection apparatus according to a fourth embodiment can be implemented by the computer 1 of the third embodiment, and the control unit 10 executes the abnormality detection program 11a to implement functions illustrated in FIG. 12. Therefore, the description of the configuration of the computer 1 of the fourth embodiment and the process performed with each function will be omitted. In the computer 1 of the fourth embodiment, the correlation value calculation unit 10e performs a process slightly different from that of the third embodiment. The correlation value calculation unit 10e uses each of a plurality of the observation stations 2 as a central observation station and calculates the correlation value between the estimation errors calculated by the estimation error calculation unit 10d for each of the central observation station and the peripheral observation stations. Herein, the correlation value calculation unit 10e of the third embodiment described above sets a first predetermined number (for example, 30) of the observation stations 2 in the vicinity of the central observation station as the peripheral observation stations. Specifically, the first predetermined number of observation stations 2 are selected as the peripheral observation stations in order of position proximity to the central observation station. On the other hand, the correlation value calculation unit 10e of the fourth embodiment sets a first predetermined number (for example, three or four) of the observation stations 2 in a predetermined positional relationship with the central observation station as the peripheral observation stations. Specifically, the first predetermined number of observation stations 2 separated by a predetermined distance from the central observation station are selected as the peripheral observation stations.

Figure 13:
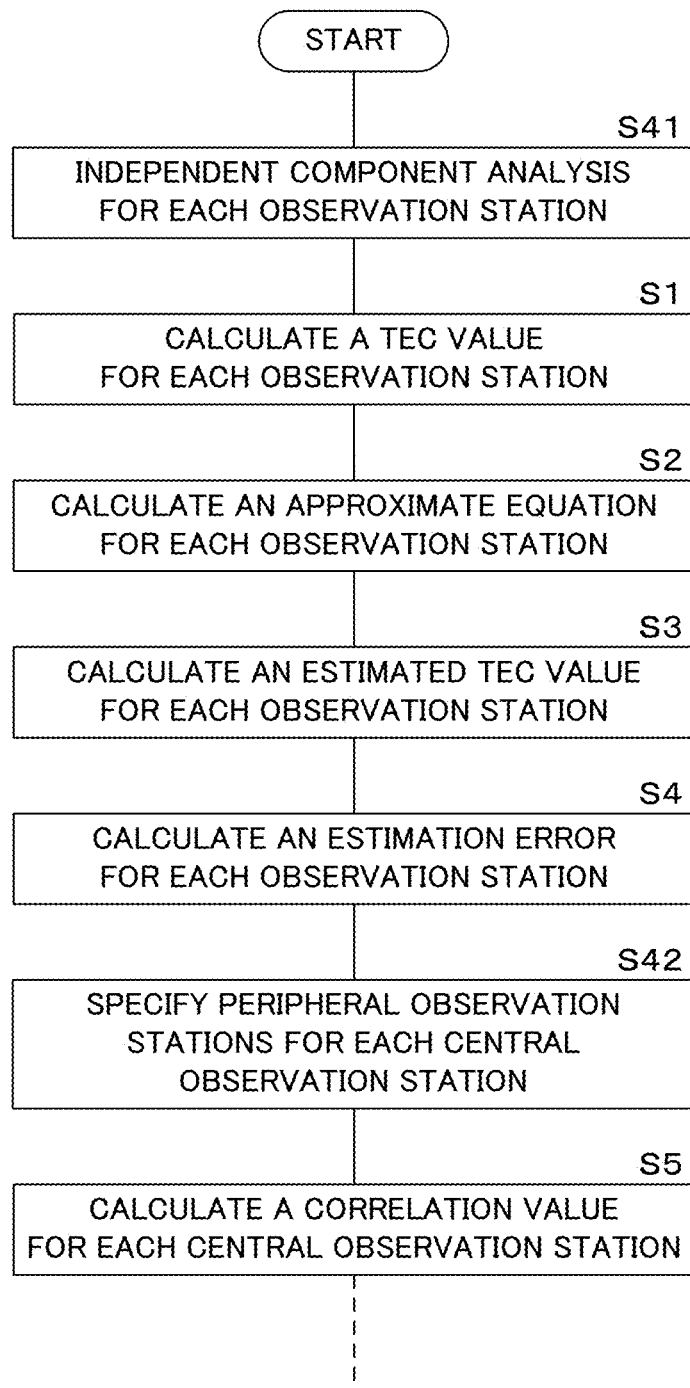
FIG. 13 is a flowchart illustrating a procedure of processes performed by a computer of a fourth embodiment.
Figure 14A:
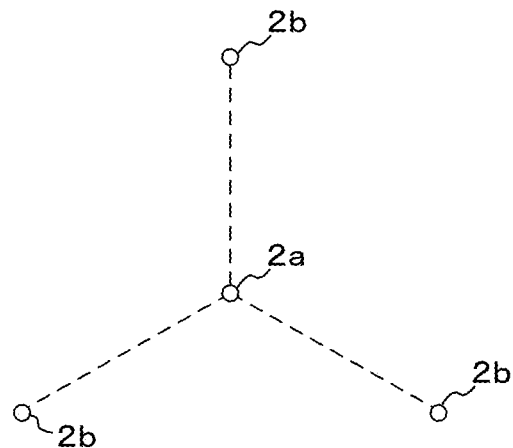
FIG. 14A is a schematic diagram illustrating processes performed by the computer of the fourth embodiment.
Figure 14B:
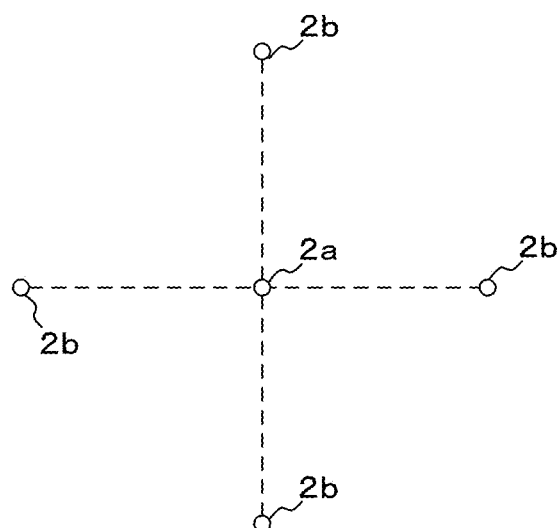
FIG. 14B is a schematic diagram illustrating processes performed by the computer of the fourth embodiment.
Figure 14C:
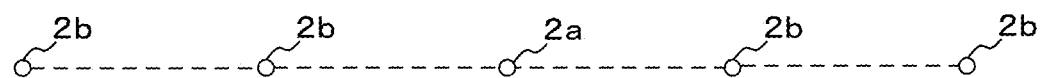
FIG. 14C is a schematic diagram illustrating processes performed by the computer of the fourth embodiment.

Next, processes performed by the computer 1 of the fourth embodiment will be described. FIG. 13 is a flowchart illustrating a procedure of the processes performed by the computer 1 of the fourth embodiment, and FIGS. 14A to 14C are schematic diagrams illustrating the processes performed by the computer 1 of the fourth embodiment. In addition, in FIG. 13, a process of step S41 is added before the process of step S1 in FIG. 9, and a process of step S42 is added between the processes of steps S4 and S5. And in FIG. 13, the illustration of steps S6 to S10 in FIG. 9 will be omitted.

In the computer 1 of the fourth embodiment, the control unit 10 (independent component analysis unit 10i) performs an independent component analysis on observation data of each observation station 2 stored in the observation data DB 11b (S41). With this configuration, the control unit 10 separates the observation data into a component of the signal transmitted from the satellite 3 and a component of the noise added to the signal in the communication path and extracts the component of the signal transmitted from the satellite 3 to generate observation data from which the noise component have been removed. The observation data from which the noise component has been removed may be temporarily stored in the storage unit 11. The control unit 10 performs the processes of steps S1 to S4 in FIG. 9 based on the observation data from which the noise component is removed by performing the independent component analysis.

Next, the control unit 10 specifies the peripheral observation stations for each central observation station in a case where each of the observation stations 2 is set as the central observation station (S42). For example, as illustrated in FIG. 14A, the control unit 10 selects three observation stations 2 separated by a certain distance (for example, 50 km or 80 km) from the central observation station 2a and sets the selected observation stations 2 as the peripheral observation stations 2b. At this time, it is preferable to select the observation stations 2 existing in such a place that the three peripheral observation stations 2b are located at the vertices of a substantially equilateral triangle. In addition, as illustrated in FIG. 14B, the control unit 10 may select four observation stations 2 separated by a certain distance (for example, 50 km or 80 km) from the central observation station 2a and sets the selected observation stations 2 as the peripheral observation stations 2b. At this time, it is preferable to select the observation station 2 existing in such a place that the four peripheral observation stations 2b are located at the vertices of a substantially square. In addition, as illustrated in FIG. 14C, the control unit 10 may also set a plurality of the observation stations 2 arranged at constant intervals (for example, 50 km or 80 km) on a line segment centered on the central observation station 2a as the peripheral observation stations 2b. Although FIG. 14C illustrates an example of a case where four observation stations 2 are set as the peripheral observation stations 2b, the number is not limited to four and may be five or more. In addition, although FIG. 14C illustrates a situation in which the central observation station 2a and the four peripheral observation stations 2b are arranged on the line segment, but the observation stations 2 arranged at certain intervals on the line segment having a predetermined width may be selected as the peripheral observation stations 2b. The positions and the number (first predetermined number) of peripheral observation stations 2b with respect to the central observation station 2a are not limited to the examples illustrated in FIGS. 14A to 14C, and the observation stations 2 having a predetermined positional relationship with each central observation station 2a can be set as the peripheral observation station 2b.

In a case where the observation station 2 separated by a certain distance from the central observation station 2a is set as the peripheral observation station 2b, the number of the peripheral observation stations 2b is not limited to three or four, but it is desirable that the number is a uniform number. In addition, the observation station 2 separated by, for example, 50 km or 80 km (a certain distance) from the central observation station 2a can be set as the peripheral observation station 2b, but the distance is not limited thereto. For example, the observation stations 2 in which the TEC values in the observation stations 2 are different form each other by a predetermined value or more may be set as the central observation station 2a and the peripheral observation station 2b. Specifically, for example, among the observation stations 2 in the vicinity of the central observation station 2a, a predetermined number (first predetermined number) of the observation stations 2 in which the TEC values in the observation stations 2 are different from the TEC value in the central observation station 2a by a predetermined value or more may be selected, and the selected observation stations 2 may be set as the peripheral observation stations 2b. In addition, the observation stations 2 in which the signals received by the observation stations 2 are different signals (not similar signals) may be set as the central observation station 2a and the peripheral observation station 2b. Specifically, a degree of similarity between the signal received by each observation station 2 among the observation stations 2 in the vicinity of, for example, the central observation station 2a and the signal received by the central observation station 2a may be calculated, a predetermined number (first predetermined number) of the observation stations 2 that have received the signal having a degree of similarity that is less than a predetermined value may be selected, and the selected observation stations 2 may be set as the peripheral observation stations 2b. In addition, the degree of similarity of the signals can be calculated, for example, by an inner product of unit vectors based on the phases (observation data) of the signals received by the central observation station 2a and the respective observation stations 2, and in a case where the inner product is less than a predetermined value, it may be determined that the signals are not similar (different).

Then, the control unit 10 (correlation value calculation unit 10e) calculates the correlation value in each central observation station based on the estimation error calculated in step S4 for the central observation station, the estimation error calculated in step S4 for the peripheral observation station specified in step S42, and the above-described Equation 1 (S5). After that, the control unit 10 performs the process of step S6 and subsequent steps. In addition, in a case where each observation station 2 is set as the central observation station, the peripheral observation stations may be determined in advance and may be stored in, for example, the storage unit 11. In this case, the control unit 10 does not perform the process of step S42 in FIG. 13 and may calculate the correlation value between the estimation error in each central observation station and the estimation error in the peripheral observation stations determined in advance for each central observation station.

Also in the fourth embodiment, the same effects as those of the first to third embodiments can be obtained. That is, also in the fourth embodiment, it is possible to detect a change in the TEC value in the ionosphere with high accuracy, and thus, it is possible to detect only the abnormal change in the TEC value accompanying the occurrence of a large earthquake with high accuracy.

In the fourth embodiment, by performing an independent component analysis on the observation data used to calculate the TEC value, noise components can be removed from the signal received by the observation station 2, so that it is possible to obtain the observation data with higher accuracy. By using such observation data, when calculating the correlation value between the estimation errors calculated for each observation station 2, it is possible to reduce the number (first predetermined number) of the peripheral observation stations with respect to the central observation station. That is, it is possible to detect the abnormal change in the TEC value by using the correlation value between the estimation error in the central observation station and the estimation errors in a small number (for example, three or four) of the peripheral observation stations. Therefore, even in an area where the number of installation locations of the observation stations 2 is small and the distance between the observation stations 2 is large, the abnormal change in the TEC value can be detected with high accuracy, so that it is possible to expand the available range of the abnormality detection apparatus.

Fifth Embodiment

Figure 15:
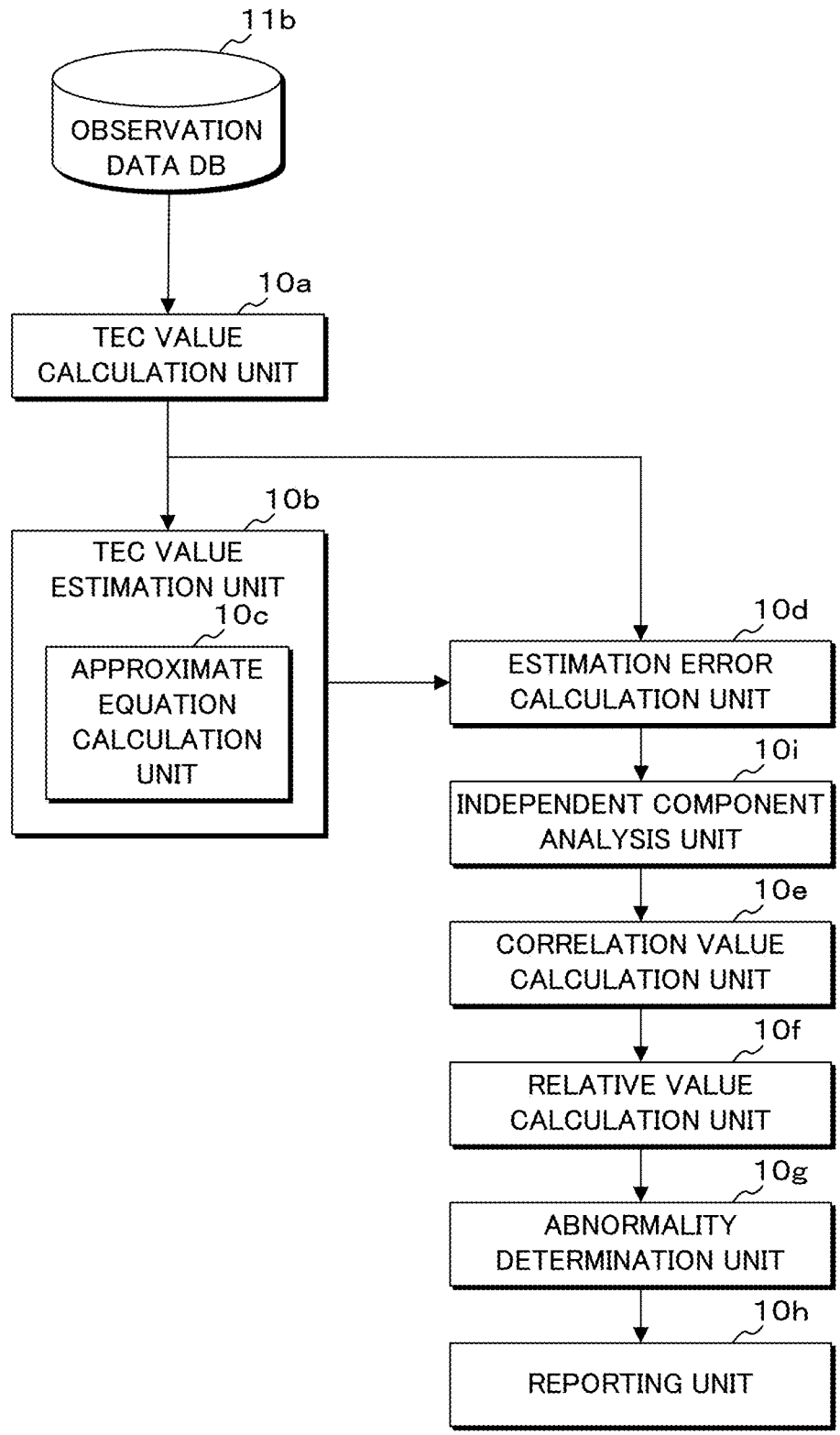
FIG. 15 is a block diagram illustrating functions implemented by a control unit of a computer of the fifth embodiment.

A modified example of the abnormality detection apparatus according to the fourth embodiment described above will be described. The abnormality detection apparatus according to the fifth embodiment can be implemented by the computer 1 of the fourth embodiment. Therefore, the description of the configuration of the computer 1 of the fourth embodiment will be omitted. FIG. 15 is a block diagram illustrating functions implemented by the control unit 10 of the computer 1 of the fifth embodiment. In a case where the control unit 10 of the computer 1 of the fifth embodiment executes the abnormality detection program 11a, the same functions as those of the fourth embodiment is implemented. Therefore, the description of the process performed with each function will be omitted. In addition, in the fifth embodiment, the independent component analysis unit 10i performs independent component analysis on the estimation error calculated by the estimation error calculation unit 10d.

Figure 16:
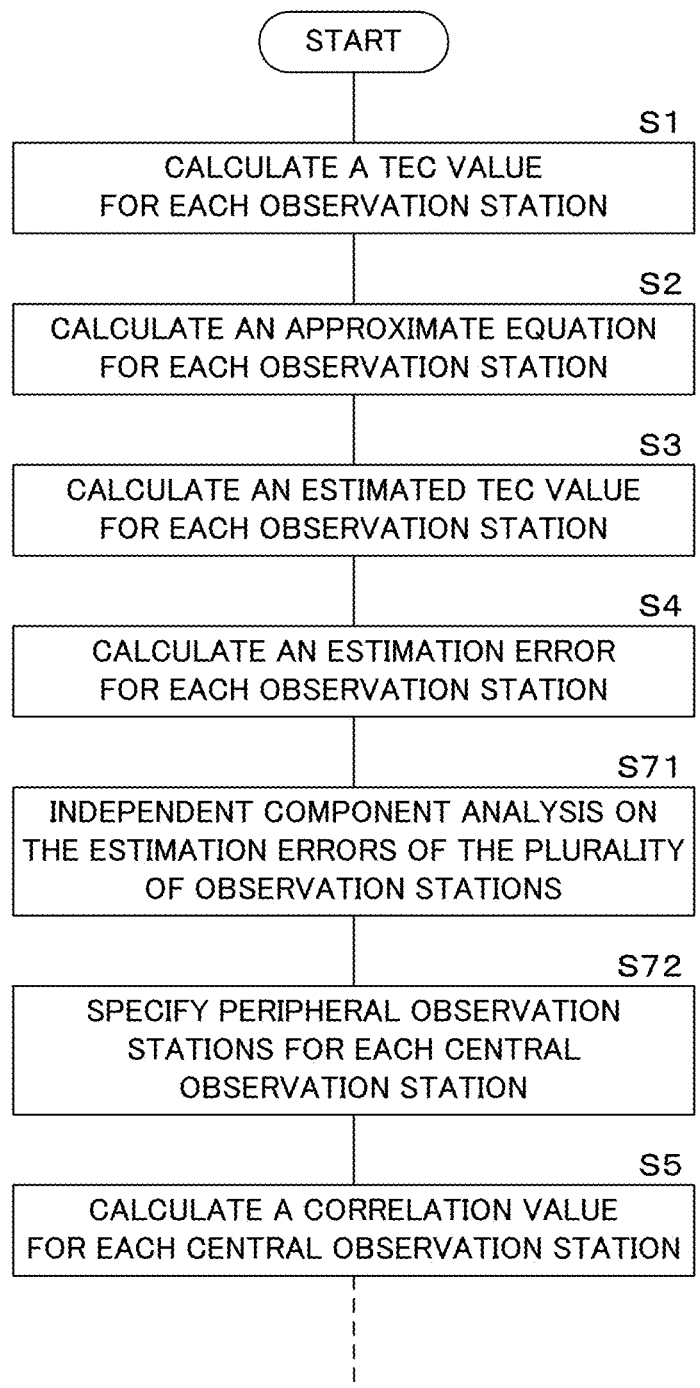
FIG. 16 is a flowchart illustrating a procedure of processes performed by the computer of the fifth embodiment.

Next, processes performed by the computer 1 of the fifth embodiment will be described. FIG. 16 is a flowchart illustrating a procedure of the processes performed by the computer 1 of the fifth embodiment. In addition, in FIG. 16, processes of steps S71 and S72 are added between the processes of steps S4 and S5 in FIG. 9, and in FIG. 16, the illustration of steps S6 to S10 in FIG. 9 will be omitted.

The control unit 10 of the computer 1 of the fifth embodiment performs the processes of steps S1 to S4 in FIG. 9. Then, the control unit 10 (independent component analysis unit 10i) performs an independent component analysis on the estimation errors (plural stations) calculated for each observation station 2 (SIP) (S71). In addition, the control unit 10 receives the estimation errors (plural-station data) of the plurality of observation stations 2 and performs the independent component analysis. With this configuration, the control unit 10 separates the estimation error calculated for each observation station 2 into a component based on the signal transmitted from the satellite 3 and a component based on the noise added in the communication path from the satellite 3. Therefore, the component based on the signal transmitted from the satellite 3 is extracted, and the estimation error from which the component based on the noise is removed is generated. Next, the control unit 10 specifies peripheral observation stations for each central observation station in a case where each of the observation stations 2 is set as a central observation station (S72). Herein, the control unit 10 performs the same process as step S42 in FIG. 13.

Then, the control unit 10 (correlation value calculation unit 10e) calculates the correlation value in each central observation station based on the estimation error obtained by performing the independent component analysis in step S71 for the central observation station, the estimation error obtained by performing the independent component analysis in step S71 for the peripheral observation stations specified in step S72, and the above-described Equation 1 (S5). After that, the control unit 10 performs processes of step S6 and subsequent steps.

Also in the fifth embodiment, the same effects as those of the first to fourth embodiments can be obtained. That is, also in the fifth embodiment, it is possible to detect the change in the TEC value in the ionosphere with high accuracy, and it is possible to detect only the abnormal change in the TEC value accompanying the occurrence of a large earthquake with high accuracy. In addition, in the fifth embodiment, by performing the independent component analysis on the estimation error calculated based on the TEC value in each observation station 2, it is possible to obtain the estimation error from which the noise component is removed. By using such an estimation error, when calculating the correlation value between the estimation errors, it is possible to reduce the number (first predetermined number) of peripheral observation stations with respect to the central observation station. That is, it is possible to detect the abnormal change in the TEC value by using the correlation value between the estimation error in the central observation station and the estimation errors in a small number (for example, three or four) of the peripheral observation stations. Therefore, even in an area where the number of installation locations of the observation stations 2 is small and the distance between the observation stations 2 is large, the abnormal change in the TEC value can be detected with high accuracy, so that it is possible to expand the available range of the abnormality detection apparatus.

Sixth Embodiment

A modified example of the abnormality detection apparatus according to the first embodiment described above will be described. An abnormality detection apparatus according to a sixth embodiment can be implemented by the computer 1 of the first embodiment. In the first embodiment described above, by using the relative value 11(*t*) calculated in each SIP (observation station 2), it is determined whether or not the TEC value in each SIP has been abnormally changed. In the sixth embodiment, by using the correlation value in each SIP calculated by the correlation value calculation unit 10*e*, it is determined whether or not the TEC value in each SIP has been abnormally changed. The computer 1 of the sixth embodiment implements the functions other than the function of the relative value calculation unit 10*f* among the functions illustrated in FIG. 3 by the control unit 10 executing the abnormality detection program 11*a*. Therefore, the description of the configuration of the computer 1 of the sixth embodiment and the process performed with each function will be omitted.

In the computer 1 of the sixth embodiment, the abnormality determination unit 10*g* performs a process slightly different from that of the first embodiment. The abnormality determination unit 10*g* of the sixth embodiment performs processing based on the correlation values in all the observation stations 2 (central observation stations) calculated by the correlation value calculation unit 10*e* at a time point T. The abnormality determination unit (determination unit) 10*g* determines whether or not the correlation value of each observation station 2 (each SIP) calculated by the correlation value calculation unit 10*e* is a predetermined threshold value (for example, 3.5σ) or more. Then, in a case where the correlation value is the predetermined threshold value or more, the abnormality determination unit 10*g* determines that the TEC value in the observation station 2 (SIP) has been abnormally changed.

Figure 17:
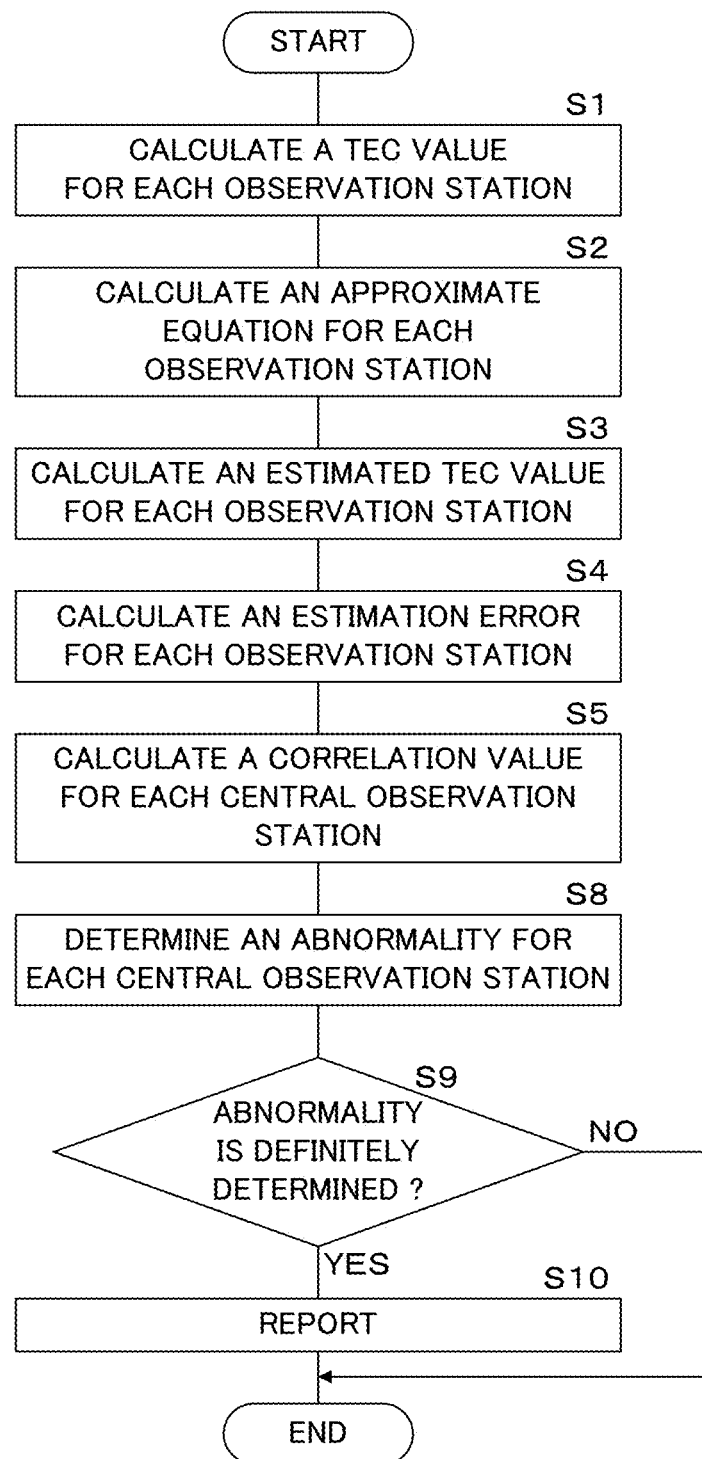
FIG. 17 is a flowchart illustrating a procedure of processes performed by a computer of the sixth embodiment.

Next, processes performed by the computer 1 of the sixth embodiment will be described. FIG. 17 is a flowchart illustrating a procedure of the processes performed by the computer 1 of the sixth embodiment. FIG. 17 is obtained by deleting the processes of steps S6 and S7 from the processes illustrated in FIG. 9.

In the computer 1 of the sixth embodiment, the control unit 10 performs the same processes as those of steps S1 to S5 in FIG. 9. Then, the control unit 10 (abnormality determination unit 10*g*) determines whether or not the TEC value in the central observation station (each SIP) has been abnormally changed based on whether or not the correlation value in each observation station 2 (each central observation station) calculated for each calculation timing is a predetermined threshold value or more. (S8). In a case where the correlation value in the observation station 2 is the predetermined threshold value or more, the control unit 10 definitely determines that the TEC value in the SIP corresponding to the observation station 2 has been abnormally changed.

Then, the control unit 10 performs the processes after step S9. Specifically, the control unit 10 determines whether or not it is definitely determined that the TEC value in the SIP corresponding to each observation station 2 has been abnormally changed (S9). Then, in a case where it is determined that an abnormal change has occurred for any of the observation stations 2 (S9: YES), the control unit 10 reports information related to the observation station 2 (SIP) for which the occurrence of abnormality has been definitely determined (S10)).

Also in the sixth embodiment, since the observation station 2 uses the signals (direct waves) received from the satellite 3 as the observation data, it is possible to detect a change in TEC value in the ionosphere with high accuracy, and thus, it is possible to detect the abnormal change in the TEC value accompanying the occurrence of a large earthquake with high accuracy. Also in the sixth embodiment, the respective configurations described in the first embodiment can be modified. The configuration of the sixth embodiment is also applicable to the second to fifth embodiments. That is, the computer 1 (the abnormality detection apparatus) of the second to fifth embodiments may have such a configuration in which it is determined whether or not the TEC value in each SIP has been abnormally changed by using the correlation value in each SIP calculated by the correlation value calculation unit 10*e*. Even with such a configuration, the same effects can be obtained.

Seventh Embodiment

A modified example of the abnormality detection apparatus according to the first embodiment described above will be described. The abnormality detection apparatus according to the seventh embodiment can be implemented by the computer 1 of the first embodiment, and the control unit 10 executes the abnormality detection program 11*a* to implement the functions illustrated in FIG. 3. Therefore, the description of the configuration of the computer 1 of the seventh embodiment and the process performed with each function will be omitted. In the computer 1 of the seventh embodiment, the abnormality determination unit 10*g* performs a process slightly different from that of the first embodiment. In a case where the relative value calculation unit 10*f* calculates the relative values in all the observation stations 2 (all the SIPs) at a time point T, the abnormality determination unit 10*g* of the seventh embodiment determines whether or not each calculated relative value of each observation station 2 (each SIP) is a predetermined threshold value (for example, 3.5) or more. Then, the abnormality determination unit 10*g* extracts the observation station 2

(SIP) in which the relative value is the predetermined threshold value or more as the observation station 2 (abnormal observation station 2) in which the TEC value in the SIP is likely to have been abnormally changed. The processes so far are the same as those of the first embodiment.

Figure 18:
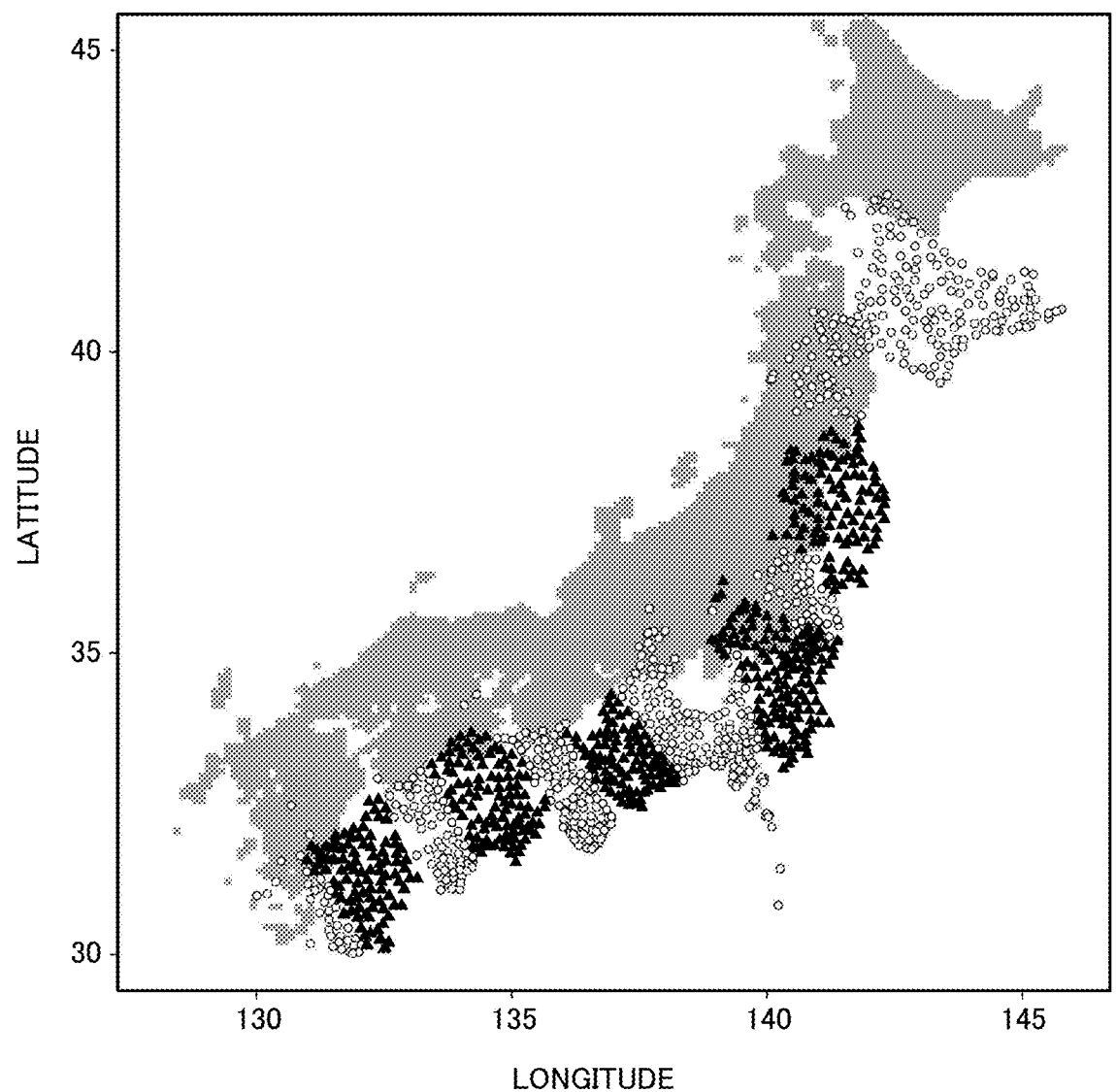
FIG. 18 is a schematic diagram illustrating a determination result by an abnormality determination unit.

FIG. 18 is a schematic diagram illustrating a determination result by the abnormality determination unit 10g. In the map illustrated in FIG. 8, a mark of a black triangle is attached to the SIP in which the observation station 2 is extracted as the abnormal observation station 2, and a mark of a white circle is attached to the SIP in which the observation station 2 is not extracted as the abnormal observation station 2. It is known that the TEC value in the ionosphere has been abnormally changed not only accompanying the occurrence of a large earthquake and has been abnormally changed but also accompanying space weather and a natural change of the day and season. In addition, as illustrated in FIG. 18, it is known that the abnormality in the ionosphere (TEC value) that occurs due to factors other than the occurrence of an earthquake is detected by a certain proportion or more of the observation stations 2 among the observable observation stations 2.

Therefore, the abnormality determination unit 10g of the seventh embodiment calculates the ratio of the observation stations 2 (SIP) extracted as the abnormal observation stations 2, and according to whether or not the calculated ratio is less than the certain ratio (for example, less than 30%), the abnormality determination unit 10g determines whether or not the detected abnormality of the TEC value is an abnormality accompanying the occurrence of a large earthquake. Specifically, in a case where the calculated ratio is less than a certain ratio, the abnormality determination unit 10g determines that the detected abnormality of the TEC value is an abnormality accompanying to the occurrence of a large earthquake, and in a case where the calculated ratio is a certain ratio or more, the abnormality determination unit 10g determines that the detected abnormality of the TEC value is not an abnormality accompanying the occurrence of a large earthquake. In addition, as a ratio of the abnormal observation stations 2, for example, the abnormality determination unit 10g calculates a ratio of the observation stations 2 extracted as the abnormal observation stations 2 to the total number of the observation stations 2 installed in the Japanese Islands. In addition, the abnormality determination unit 10g may calculate a ratio of the abnormal observation stations 2 to the number of observation stations 2 installed in each area such as the Kanto area and the Kinki area or may calculate a ratio of the abnormal observation stations 2 for each area partitioned in advance.

In a case where the abnormality determination unit 10g determines that the ratio of the abnormal observation station 2 is a certain ratio or more, that is, in a case where the detected abnormality of the TEC value is not an abnormality accompanying the occurrence of a large earthquake, the reporting unit 10h does not perform a reporting process. On the other hand, in a case where the abnormality determination unit 10g determines that the ratio of the abnormal observation station 2 is less than a certain ratio, that is, in a case where the detected abnormality of the TEC value is an abnormality accompanying the occurrence of a large earthquake, the abnormality determination unit 10g performs the same processes as those in the first embodiment. Specifically, with respect to the observation stations 2 extracted as the abnormal observation stations 2, the abnormality determination unit 10g determines whether or not a second predetermined number (for example, four) of observation stations 2 in the vicinity are also extracted as the abnormal observation stations 2. Then, in a case where a plurality of the observation stations 2 in the vicinity are also extracted as the abnormal observation stations 2, the abnormality determination unit 10g definitely determines that that the TEC value in this observation station 2 (SIP) has been abnormally changed accompanying the occurrence of a large earthquake. In this case, the reporting unit 10h performs a reporting process.

Figure 19:
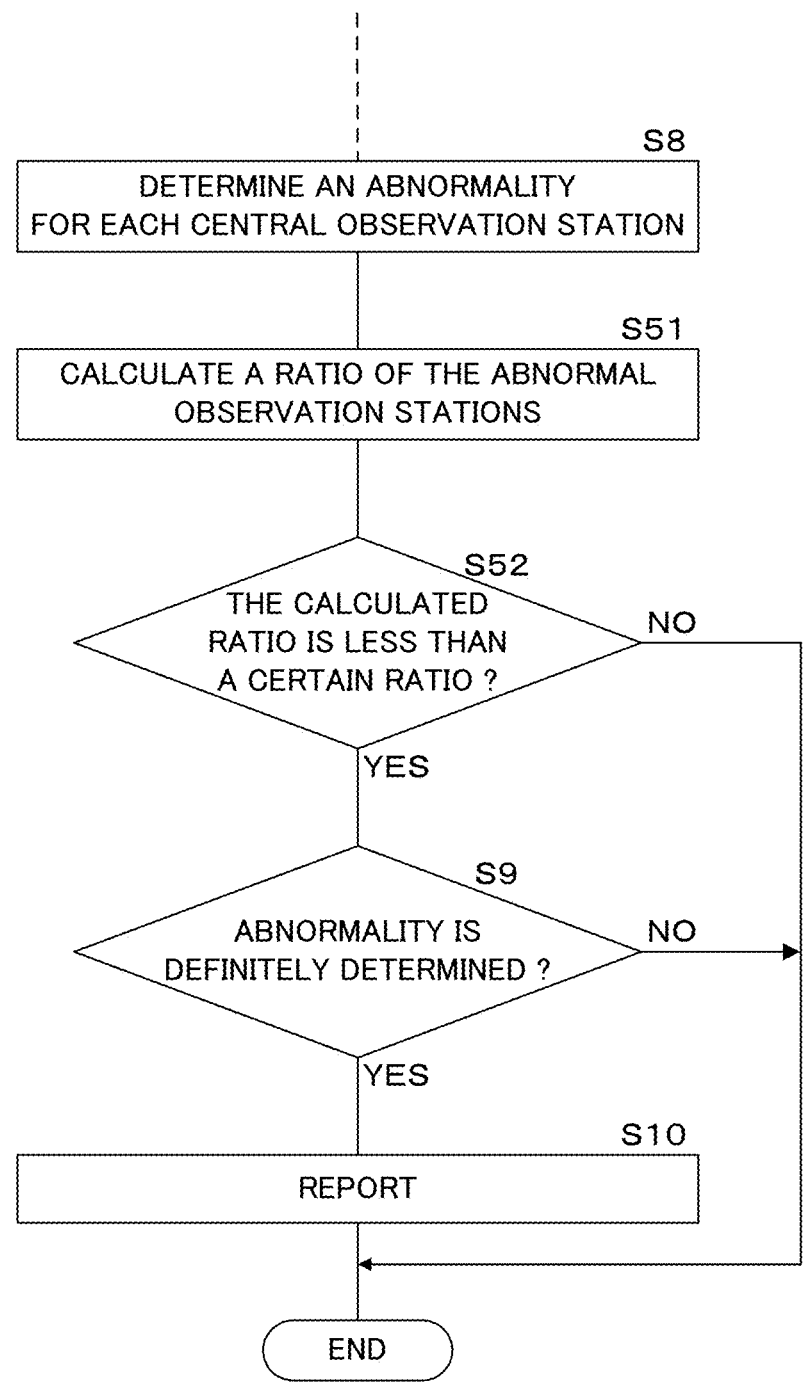
FIG. 19 is a flowchart illustrating a procedure of processes performed by a computer of a seventh embodiment.

Next, processes performed by the computer 1 of the seventh embodiment will be described. FIG. 19 is a flowchart illustrating a procedure of the processes performed by the computer 1 of the seventh embodiment. In addition, in FIG. 19, processes of steps S51 and S52 are added between the processes of steps S8 and S9 in FIG. 9, and in FIG. 19, the illustration of steps S1 to S7 in FIG. 9 will be omitted.

In the computer 1 of the seventh embodiment, the control unit 10 performs the same processes as those of steps S1 to S8 in FIG. 9. Then, the control unit 10 (abnormality determination unit 10g) calculates a ratio of the observation stations 2 (abnormal observation stations 2) in which the relative value is determined to be the predetermined threshold value or more and the TEC value is determined to have been abnormally changed (S51), and the control unit 10 determines whether or not the calculated ratio is less than a certain ratio (S52). In a case where it is determined that the calculated ratio is less than a certain ratio (S52: YES), the control unit 10 performs the processes of step S9 and subsequent steps on the assumption that the detected abnormality of the TEC value is an abnormality accompanying the occurrence of a large earthquake. In a case where it is determined that the calculated ratio is a certain ratio or more (S52: NO), the control unit 10 ends the processing, on the assumption that the detected abnormality of the TEC value is not an abnormality accompanying the occurrence of a large earthquake.

In the seventh embodiment, in a case where the percentage of SIPs (abnormal observation stations 2) determined that the TEC value is likely to have been abnormally changed is a certain percentage or more (for example, 30% or more), a reporting process is not performed on the assumption that the detected abnormality of the TEC value is not an abnormality accompanying the occurrence of a large earthquake. Therefore, in a case where an abnormality of the TEC value is simultaneously detected in a certain ratio or more of the observation stations 2, it is definitely determined that the abnormality is not an abnormality accompanying the occurrence of a large earthquake, so that the abnormality of the TEC value that occurs due to factors other than the occurrence of an earthquake can be excluded from the abnormality of the report object. Accordingly, it is possible to detect only the abnormal change in the TEC value accompanying the occurrence of a large earthquake with high accuracy, and it is possible to perform a reporting process.

The configuration of the seventh embodiment is also applicable to the second to sixth embodiments, and even in a case where the configuration is applied to the second to sixth embodiments, the same effects can be obtained. In addition, in a case where the configuration is applied to the sixth embodiment, the abnormality determination unit 10g determines whether or not the correlation value of each observation station 2 (each SIP) calculated by the correlation value calculation unit 10e at a time point T is a predetermined threshold value (for example, $3.5\sigma$) or more. Then, the abnormality determination unit 10g extracts the observation station 2 (SIP) in which the correlation value is the predetermined threshold value or more as the observation station 2 (abnormal observation station 2) in which the TEC value in the SIP is likely to have been abnormally changed. Then, the abnormality determination unit 10g calculates the ratio of the extracted abnormal observation station 2 (SIP), and in a case where the calculated ratio is a certain ratio or more (for example, 30% or more), the abnormality determination unit 10g determines that the detected abnormality of the TEC value is not an abnormality accompanying the occurrence of an earthquake. In a case where the abnormality determination unit 10g determines that the detected abnormality of the TEC value is not an abnormality accompanying the occurrence of an earthquake, the reporting unit 10h does not perform a reporting process. On the other hand, in a case where the ratio of the abnormal observation station 2 (SIP) is less than a certain ratio, the abnormality determination unit 10g determines that the detected abnormality of the TEC value is an abnormality accompanying the occurrence of an earthquake.

Eighth Embodiment

A modified example of the abnormality detection apparatus according to the first embodiment described above will be described. The abnormality detection apparatus according to the eighth embodiment can be implemented by the computer 1 of the first embodiment, and the control unit 10 executes the abnormality detection program 11a to implement the functions illustrated in FIG. 3. Therefore, the description of the configuration of the computer 1 of the eighth embodiment and the process performed with each function will be omitted. The computer 1 of the eighth embodiment is configured so as to be able to optimize the determination criterion (predetermined threshold value) when the abnormality determination unit 10g determines whether or not each observation station 2 is an abnormal observation station 2. Specifically, the threshold value used for the abnormality determination unit 10g to determine whether or not the TEC value in each SIP has been abnormally changed (whether or not each observation station is an abnormal observation station 2) based on the relative value of each observation station 2 (each SIP) calculated by the relative value calculation unit 10f is optimized.

FIG. 20 is a schematic diagram illustrating a configuration example of the reference data DB. A plurality of reference data are accumulated in the reference data DB. The reference data illustrated in FIG. 20 includes the determination criterion (threshold value) used when determining whether or not each observation station 2 is the abnormal observation station 2, information (presence or absence of abnormality detection) indicating whether or not an abnormal change in the TEC value is detected by using the determination criterion, and information (presence or absence of the occurrence of an earthquake) indicating whether or not an earthquake has actually occurred. The determination criterion and the information on the presence or absence of abnormality detection included in the reference data is generated by determining whether or not the TEC value has been abnormally changed by using different threshold values based on the previous observation data. In addition, the presence or absence of the occurrence of an earthquake included in the reference data is input by the user of the computer 1 (for example, an observer of the earthquake). In addition, the reference data may include the distribution of the TEC values, the distribution of the relative values of each observation station 2 calculated based on the TEC values, and the like.

By using the reference data stored in the reference data DB, the computer 1 specifies the threshold value (determination criterion) optimal for the abnormality determination unit 10g to determine whether or not each observation station 2 is an abnormal observation station 2 based on the relative value of each observation station 2 (each SIP) calculated by the relative value calculation unit 10f. Then, the computer 1 uses the specified optimal threshold value for the processing from the next time. By optimizing the determination criterion in this manner, it is possible to detect the abnormal change in the TEC value accompanying the occurrence of an earthquake with higher accuracy. Moreover, since the optimal threshold value can be set according to the location of detection object, the determination criterion can be set in consideration of the natural environment of each location, or the like.

The configuration of the eighth embodiment is also applicable to the second to seventh embodiments, and even in a case where the configuration is applied to the second to seventh embodiments, the same effects can be obtained. In addition, when the configuration is applied to the sixth embodiment, the computer 1 can optimize the threshold value for the abnormality determination unit 10g determining whether or not the TEC value in each SIP has been abnormally changed (whether or not the observation station is the abnormal observation station 2) based on the correlation value of each observation station 2 (each SIP) calculated by the correlation value calculation unit 10e.

A further modified example of the abnormality detection apparatus according to the first to eighth embodiments described above will be described. The abnormality detection apparatus according to the first to eighth embodiments can be used in combination with, for example, a geomagnetic observation apparatus (not illustrated) that observes the geomagnetism on the ground surface. The geomagnetic observation apparatus has, for example, a geomagnetic sensor, detects geomagnetism on the ground surface by the geomagnetic sensor, and observes whether the detected state of geomagnetism is normal or an abnormality has occurred. For example, the geomagnetic observation apparatus detects the geomagnetism of the ground surface at predetermined time intervals, and in a case where a difference between the detected value of the geomagnetism and the latest detected value becomes a predetermined value or more or in a case where an abnormality occurs in the time change of the detected geomagnetism, it is determined that an abnormality has occurred in the geomagnetism of the ground surface. In a case where the geomagnetic observation apparatus determines that an abnormality occurs in the geomagnetism, the geomagnetic observation apparatus notifies the abnormality detection apparatus (computer 1) according to the first to eighth embodiments. The computer 1 performs the processes of the first to eighth embodiments described above in a case where a geomagnetic abnormality is notified of from the geomagnetic observation apparatus.

Figure 21:
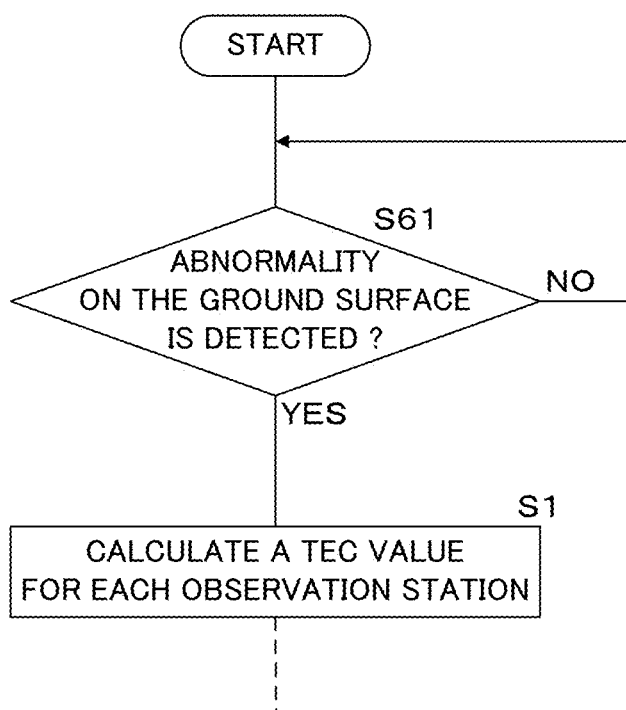
FIG. 21 is a flowchart illustrating a procedure of processes performed by a computer.

FIG. 21 is a flowchart illustrating a procedure of processes performed by the computer 1. In addition, in FIG. 21, a process of step S61 is added before the process of step S1 in FIG. 9, and in FIG. 21, the illustration of steps S2 to S10 in FIG. 9 will be omitted. The control unit 10 of the computer 1 determines whether or not a geomagnetic abnormality on the ground surface is detected by the geomagnetic observation apparatus, based on a notification from, for example, the geomagnetic observation apparatus (S61). In a case where it is determined that the geomagnetic abnormality on the ground surface is not detected (S61: NO), the control unit 10 stands by. In a case where it is determined that the geomagnetic abnormality is detected (S61: YES), the control unit 10 performs the process of step S1 and subsequent steps in FIG. 9. That is, the control unit 10 performs a process of detect whether or not the TEC value has been abnormally changed based on the observation data.

For example, it is known that an abnormality has occurred in the geomagnetism and the like on the ground surface several weeks before the occurrence of a large earthquake. Therefore, in a case where it is detected that an abnormality has occurred in the geomagnetism on the ground surface, a process of detecting whether or not the TEC value has been abnormally changed based on the observation data received from the satellite 3 may be performed. In this case, it is possible to efficiently detect an abnormal change in the TEC value accompanying the occurrence of an earthquake. In addition, instead of the geomagnetism on the ground surface, by using a reflected wave by the ionosphere, it may be determined whether or not an abnormality has occurred on the ground surface or the like. For example, long radio waves such as very low frequency (VLF) are transmitted from a ground transmission antenna, and after being reflected by the ionosphere, the radio waves are received by a ground reception antenna. In the reflected wave received in this manner, for example, in a case where a change occurs in the intensity, frequency, or the like of the received reflected wave, it can be determined that a certain abnormality has occurred in the ground surface.

In the first to eighth embodiments described above, the observation data may be data related to a signal (radio wave) received by a receiver mounted on a mobile object such as an automobile, a train, a ship, or the like from the satellite 3 in addition to the data related to the signal (radio wave) received from the satellite 3 by the observation station 2 installed on the ground. For example, similarly to the observation station 2, a receiver capable of receiving signals having different frequencies (for example, signals having frequencies of 1.5 GHz and 1.2 GHz) transmitted from the satellite 3 arranged in space may be mounted on the mobile. Then, each receiver can use the phase in each time point of receiving two signals as observation data. In addition, in a case where each receiver acquires observation data, the information (information related to an observation position) indicating the current position at this time point is acquired and stored in association with the observation data. Accordingly, the locations (observation positions) where the observation data are acquired can be grasped, and the information related to each of a plurality of the observation positions and the information related to the signals from the satellite received at each observation position can be stored in association with each other. Even in a case where such observation data is used, the TEC value in the atmosphere between each observation position and the satellite can be calculated, and an abnormal change in the TEC value can be detected. With such a configuration, even in an area where the number of installation locations of the observation station 2 is small, the abnormal change in the TEC value can be detected by using the observation data received by the receiver mounted on the mobile, so that the available range of the abnormality detection apparatus is expanded. In addition, by using observation data received by a receiver mounted on a ship, it is possible to perform the process of detecting the abnormal change in the TEC value on the sea, similarly to the ground. In addition, in a case where such observation data is used, the observation data acquired at an observation position within a predetermined range (for example, within a circular area having a diameter of several kilometers) may be treated as the observation data acquired at the same observation position. For example, in a case where receivers consecutively acquire the observation data and the observation position acquired with the observation data is not separated from the nearest (previous) observation position by a predetermined distance (for example, several km), the nearest observation position may be set as the current observation position.

It should be understood that the embodiments disclosed herein are exemplarily illustrative in all respects and not restrictive. The scope of the present invention is not the meaning described above, but it is indicated by the claims and is intended to include all modifications within the meaning and scope equivalent to the claims.

It is to be noted that, as used herein and in the appended claims, the singular forms "a", "an", and "the" include plural referents unless the context clearly dictates otherwise.

The invention claimed is:

1. An abnormality detection apparatus comprising a processor, the processor performing:
    calculating a change amount of a total number of electrons from an observation start time in an atmosphere comprising an ionosphere between each of a plurality of observation stations installed on a ground and a satellite based on information related to a signal received from the satellite for each of a plurality of the observation stations at predetermined time intervals;
    estimating a change amount to be calculated next based on a plurality of the change amounts calculated over a first predetermined time for each observation station and calculating a difference between the estimated change amount and the change amount calculated next;
    calculating a correlation value between the difference calculated for each observation station and the difference calculated for a first predetermined number of observation stations having a predetermined positional relationship with each observation station;
    determining that an abnormality has occurred in a change in the total number of electrons in the atmosphere between the observation station and the satellite, in a case where the correlation value calculated for each observation station is a predetermined threshold value or more; and
    performing a reporting process, in a case where it is determined that an abnormality has occurred.

2. The abnormality detection apparatus according to claim 1, wherein the processor calculates a correlation value between the difference calculated for each observation station and the difference calculated for the first predetermined number of observation stations separated by a predetermined distance from each observation station.

3. The abnormality detection apparatus according to claim 1, wherein the processor calculates a correlation value between the difference calculated for each observation station and the difference calculated for the first predetermined number of observation stations in which the change amounts calculated for each observation station are different by a predetermined value or more in the vicinity of each observation station.

4. The abnormality detection apparatus according to claim 1, wherein the processor calculates a correlation value between the difference calculated for each observation station and the difference calculated for the first predetermined number of observation stations in the vicinity of each observation station.

5. The abnormality detection apparatus according to claim 1, wherein the processor calculates a correlation value between the difference calculated for each observation station and the difference calculated for the first predetermined number of observation stations in which a degree of similarity between the signals received by each of the observation stations is less than a predetermined value.

6. The abnormality detection apparatus according to claim 1, wherein, in a case where the correlation value calculated for each observation station is the predetermined threshold value or more, when the correlation value calculated for each of a second predetermined number of observation stations in the vicinity of the observation station is the predetermined threshold value or more, the processor determines that an abnormality has occurred in a change in the total number of electrons between the observation station and the satellite.

7. The abnormality detection apparatus according to claim 1, wherein the processor further performs
obtaining an approximate equation indicating a time change of a plurality of the change amounts calculated over the first predetermined time for each observation station based on a plurality of the change amounts and estimating the change amount to be calculated next based on the obtained approximate equation.

8. The abnormality detection apparatus according to claim 7,
wherein the processor calculates a difference between the change amount calculated at the predetermined time intervals over a second predetermined time subsequent to the first predetermined time for each observation station and the change amount estimated based on the approximate equation with respect to the calculation timings of the change amount, and
wherein the processor calculates a correlation value between the difference calculated for each observation station with respect to the calculation timing and the difference calculated with respect to the first predetermined number of observation stations.

9. The abnormality detection apparatus according to claim 8, wherein the processor calculates the correlation value $C(T)$ at a time point T in any one of the observation stations $x_0$ based on a following Equation 1:

$$C(T) = \frac{1}{M \times N} \sum_{i=1}^{M} \sum_{j=0}^{N-1} (x_{i, t+t_{sample}+j\Delta t}) \times (x_{0, t+t_{sample}+j\Delta t}) \quad \text{(Equation 1)}$$

herein, $x_i$ indicates any one of the first predetermined number of observation stations,
$x_{0,t0}$ indicates the difference at a time point t0 in the observation station $x_0$,
$x_{i,t0}$ indicates the difference at the time point t0 in the observation station $x_i$, and
an arbitrary time point is indicated by t, the first predetermined time is indicated by $t_{sample}$, the second predetermined time is indicated by $t_{test}$, and the time point T indicates a time point when a time $t_{sample}$ and a time $t_{test}$ have elapsed from arbitrary time point t, and
in addition, M indicates the first predetermined number, N indicates the number of change amounts of the total number of electrons from the observation start time, which are calculated over the second predetermined time $t_{test}$, and $\Delta t$ is a time interval for calculating the change amount of the total number of electrons from the observation start time and indicated by $\Delta t = t_{test}/(N-1)$.

10. The abnormality detection apparatus according to claim 1, wherein the processor calculates a correlation value between the difference calculated for each observation station and the difference calculated for two observation stations among the first predetermined number of observation stations.

11. The abnormality detection apparatus according to claim 1, wherein the processor further performs:
calculating a median value med(T) and a standard deviation σ(T) of the correlation value at a time point T calculated for each observation station; and
calculating a relative value η(T) to the median value med(T) of the correlation value C(T) of each observation station based on the calculated median value med(T) and the calculated standard deviation σ(T) based on the following equation, $$\eta(T) = (C(T) - med(T))/\sigma(T)$$

wherein, in a case where the calculated relative value is a predetermined threshold value or more, when the relative value calculated for each of a second predetermined number of observation stations in the vicinity of the observation station is the predetermined threshold value or more, the processor determines that an abnormality has occurred in a change in the total number of electrons between the observation station and the satellite.

12. The abnormality detection apparatus according to claim 1, wherein the processor further performs
an independent component analysis on signals received from the satellites by each of the observation stations.

13. The abnormality detection apparatus according to claim 1, wherein, in a case where it is determined that an abnormality has occurred for at least a specified percentage of observation stations among the plurality of observation stations, the processor does not perform a reporting process.

14. The abnormality detection apparatus according to claim 1, wherein, in a case where the time of continuously determining that an abnormality has occurred in a change in the total number of electrons between the observation station and the satellite has reached a predetermined time, the processor definitely determines that an abnormality has occurred in the change of total number of electrons between the observation station and the satellite.

15. The abnormality detection apparatus according to claim 1,
wherein the information related to the signal is a phase of each of two signals having different frequencies, and
wherein the processor calculates the change amount of the total number of electrons from the observation start time in the atmosphere based on a phase difference between the two signals.

16. The abnormality detection apparatus according to claim 1, wherein the processor further performs
specifying the predetermined threshold value, which is a criterion for determining whether or not an abnormality has occurred in the change in the total number of electrons between the observation station and the satellite, based on previous observation data.

17. An abnormality detection apparatus comprising a processor, the processor performing:
calculating a change amount of a total number of electrons from an observation start time in an atmosphere comprising an ionosphere between each observation position and a satellite based on information related to each of a plurality of observation positions and information related to a signal received from the satellite for each of the observation positions at predetermined time intervals;

estimating a change amount to be calculated next based on a plurality of the change amounts calculated over a first predetermined time for each observation position and calculating a difference between the estimated change amount and the change amount calculated next;

calculating a correlation value between the difference calculated for each observation position and the difference calculated for a first predetermined number of observation positions having a predetermined positional relationship with each observation position;

determining that an abnormality has occurred in a change in the total number of electrons in the atmosphere between the observation position and the satellite, in a case where the correlation value calculated for each observation position is a predetermined threshold value or more; and performing a reporting process, in a case where it is determined that an abnormality has occurred.

18. A communication apparatus comprising:
a reception unit that receives information reported from the abnormality detection apparatus according to claim 1; and
a notification unit that notifies the information received by the reception unit.

19. An abnormality detection method causing an abnormality detection apparatus to execute processes of:
calculating a change amount of a total number of electrons from an observation start time in an atmosphere comprising an ionosphere between each of a plurality of observation stations installed on a ground and a satellite based on information related to a signal received from the satellite for each of a plurality of the observation stations at predetermined time intervals;

estimating a change amount to be calculated next based on a plurality of the change amounts calculated over a first predetermined time for each observation station, and calculating a difference between the estimated change amount and the change amount calculated next;

calculating a correlation value between the difference calculated for each observation station and the difference calculated for a first predetermined number of observation stations having a predetermined positional relationship with each observation station;

determining that an abnormality has occurred in a change in the total number of electrons in the atmosphere between the observation station and the satellite, in a case where the correlation value calculated for each observation station is a predetermined threshold value or more; and performing a reporting process, in a case where it is determined that an abnormality has occurred.

20. An abnormality detection method causing an abnormality detection apparatus to execute processes of:
calculating a change amount of a total number of electrons from an observation start time in an atmosphere comprising an ionosphere between each observation position and a satellite based on information related to each of a plurality of observation positions and information related to a signal received from the satellite for each of the observation positions at predetermined time intervals;

estimating a change amount to be calculated next based on a plurality of the change amounts calculated over a first predetermined time for each observation position, and calculating a difference between the estimated change amount and the change amount calculated next;

calculating a correlation value between the difference calculated for each observation position and the difference calculated for a first predetermined number of observation positions having a predetermined positional relationship with each observation position;

determining that an abnormality has occurred in a change in the total number of electrons in the atmosphere between the observation position and the satellite, in a case where the correlation value calculated for each observation position is a predetermined threshold value or more; and performing a reporting process, in a case where it is determined that an abnormality has occurred.

21. A non-transitory computer readable recording medium storing a program causing a computer to execute processes of:
calculating a change amount of a total number of electrons from an observation start time in an atmosphere comprising an ionosphere between each of a plurality of observation stations installed on a ground and a satellite based on information related to a signal received from the satellite for each of a plurality of the observation stations at predetermined time intervals;

estimating a change amount to be calculated next based on a plurality of the change amounts calculated over a first predetermined time for each observation station, and calculating a difference between the estimated change amount and the change amount calculated next;

calculating a correlation value between the difference calculated for each observation station and the difference calculated for a first predetermined number of observation stations having a predetermined positional relationship with each observation station;

determining that an abnormality has occurred in a change in the total number of electrons in the atmosphere between the observation station and the satellite, in a case where the correlation value calculated for each observation station is a predetermined threshold value or more; and performing a reporting process, in a case where it is determined that an abnormality has occurred.

22. A non-transitory computer readable recording medium storing the program causing a computer to execute processes of:
calculating a change amount of a total number of electrons from an observation start time in an atmosphere comprising an ionosphere between each observation position and a satellite based on information related to each of a plurality of observation positions and information related to a signal received from the satellite for each of the observation positions at predetermined time intervals;

estimating a change amount to be calculated next based on a plurality of the change amounts calculated over a first predetermined time for each observation position, and calculating a difference between the estimated change amount and the change amount calculated next;

calculating a correlation value between the difference calculated for each observation position and the difference calculated for a first predetermined number of observation positions having a predetermined positional relationship with each observation position;

determining that an abnormality has occurred in a change in the total number of electrons in the atmosphere between the observation position and the satellite, in a case where the correlation value calculated for each observation position is a predetermined threshold value or more; and performing a reporting process, in a case where it is determined that an abnormality has occurred.

23. A communication apparatus comprising:

a reception unit that receives information reported from the abnormality detection apparatus according to claim 17; and a notification unit that notifies the information received by the reception unit.

* * * * *